US005463410A

United States Patent [19]

[11] Patent Number: 5,463,410
[45] Date of Patent: Oct. 31, 1995

Uchiyama et al.

[54] IMAGE RECORDING APPARATUS USING OPTICAL BEAM

[75] Inventors: Seiji Uchiyama, Tokyo; Akio Noguchi, Yokohama; Yukihide Ushio; Shinpei Matsuo, both of Tokyo; Youji Serizawa; Makoto Takeuchi, both of Yokohama; Kazurou Yamada, Tokyo; Junichi Kato, Yokohama, all of Japan

[73] Assignee: Canon Kabushiki Kaisha, Tokyo, Japan

[21] Appl. No.: 252,625

[22] Filed: Jun. 1, 1994

Related U.S. Application Data

[63] Continuation of Ser. No. 633,134, Dec. 24, 1990, abandoned.

[30] Foreign Application Priority Data

| | | | |
|---|---|---|---|
| Dec. 27, 1989 | [JP] | Japan | 1-339406 |
| Mar. 1, 1990 | [JP] | Japan | 2-51359 |
| Mar. 23, 1990 | [JP] | Japan | 2-74757 |

[51] Int. Cl.[6] .......... G01D 9/42

[52] U.S. Cl. .......... 347/133; 358/298; 358/300; 358/302; 372/29; 347/246

[58] Field of Search .......... 346/108, 160; 358/296, 300, 302; 250/235; 355/273; 372/29

[56] References Cited

U.S. PATENT DOCUMENTS

| | | | |
|---|---|---|---|
| 4,059,833 | 11/1977 | Kitamura et al. | 346/108 |
| 4,513,300 | 4/1985 | Tatsuno et al. | 346/160 |
| 4,640,606 | 2/1987 | Inamoto | 355/14 TR |
| 4,695,714 | 9/1987 | Kimizuka et al. | 346/108 |
| 4,712,118 | 12/1987 | Seto et al. | 346/108 |
| 4,812,861 | 3/1989 | Sasaki et al. | 354/4 |
| 4,908,634 | 3/1990 | Arimoto et al. | 346/108 |
| 5,043,745 | 8/1991 | Inoue et al. | 346/108 |

FOREIGN PATENT DOCUMENTS

| | | |
|---|---|---|
| 358171 | 3/1990 | European Pat. Off. . |
| 3321923 | 1/1984 | Germany . |
| 3903586 | 8/1989 | Germany . |

*Primary Examiner*—Howard B. Blankenship
*Assistant Examiner*—Patrick J. Stanzione
*Attorney, Agent, or Firm*—Fitzpatrick, Cella, Harper & Scinto

[57] ABSTRACT

In a laser beam printer, automatic optical quantity (APC) control is performed based on an optical quantity detection output to generate a laser beam having a predetermined quantity of light. In each scanning cycle, APC is effected by utilizing a period (unblanking period) in which the laser device is forcibly actuated to generate a horizontal synchronization signal. The unblanking period may be changed according to the print paper size or image formation/non-image-formation periods. Also, light quantity control may be effected through a plurality of scanning cycles before image formation and may be effected by utilizing the unblanking period during the period corresponding to the intervals of print sheets. Techniques also provided to prevent a transfer unit from being contaminated by toner images formed as a byproduct of APC.

22 Claims, 25 Drawing Sheets

FIG. 13 (1)
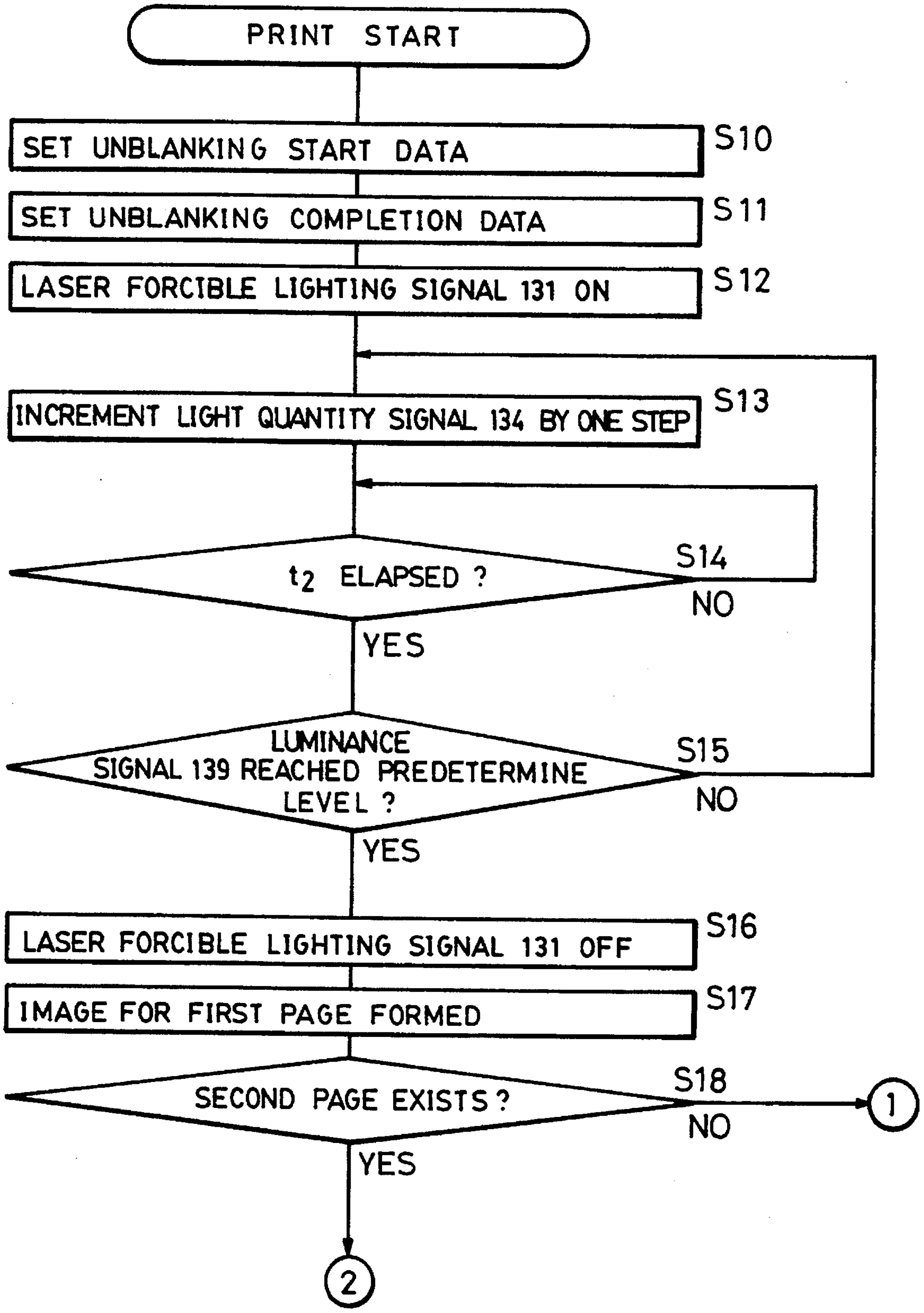

IMAGE RECORDING APPARATUS USING OPTICAL BEAM

This application is a continuation of application Ser. No. 07/633,134 filed Dec. 24, 1990, now abandoned.

BACKGROUND OF THE INVENTION

1. Field of the Invention

This invention relates to an image recording apparatus for effecting automatic optical power control (APC) over a semiconductor laser, a light emitting diode or the like.

2. Description of the Related Art

FIG. 1 is a diagram of an image forming operation of a conventional laser beam printer, and FIG. 2 is a cross-sectional view of FIG. 1.

An image signal (VDO signal) 101 is input into a laser unit 102, and the laser unit 102 outputs a laser beam 103 which is modulated in an on-off manner based on the VDO signal. A motor 104 rotates a rotating polygon mirror 105 at a constant speed to deflect the laser beam 103 into deflected laser beam 107 thereby to scan an area indicated by 107*a*.

An imaging lens 106 focuses the laser beam 107 on a photosensitive drum 108. Accordingly, the surface of the sensitive drum 108 is scanned with the laser beam 107 modulated with the image signal 101 in a horizontal direction (the main scanning direction).

Referring now to FIG. 2, elements 102 to 106 are included in exposure unit 3. The sensitive drum 108 is rotated in the direction of the arrow and is uniformly charged by a charging roller 2 to which a high voltage is applied, and a latent image is formed by irradiation with the laser beam 107.

A beam detector 109 has a photoelectric conversion element 110 (e.g., a photodiode). The beam detector 109 outputs a horizontal synchronization signal (hereinafter referred to as "BD signal") 111 for determining an image writing timing.

The latent image formed on the sensitive drum 108 is visualized as a toner image by a development device 4. This toner image is transferred to a transfer sheet 112 by a transfer roller 5 and is fixed on the transfer sheet 112 by fixing rollers 6. Residual toner left on the sensitive drum 108 is removed by a cleaning device 7.

The signals for forming the image will be described below with reference to FIG. 3.

The BD signal 111 is a main scanning direction sync signal, as mentioned above. FIG. 3 shows the timing of outputs in the main scanning direction (horizontal direction) with respect to the transfer sheet 112. The image signal 101 is output a time $t_1$ after the rise of the BD signal 111 to start forming the image at a distance $D_1$ from the left end of the transfer sheet 112.

The image signal 101 is output from an image processing unit (not shown) such as an image processor that is different from a controller for controlling the image formation sequence. The controller effects masking by an image mask signal 113 so that no area outside the image area (outside the area defined by $D_2$ in FIG. 3) is exposed even if the image processing unit turns on the image signal 101.

Since the beam detector 109 lies outside the image area, in order to generate the BD signal, it is necessary for the controller to forcibly light the laser at the time when the laser beam 107 moves across the beam detector 109. The signal used for this operation is an unblanking signal 114 (FIG. 3).

The mask signal 113 and the unblanking signals are generated by counting a system clock 124, as shown in FIG. 4.

The circuit shown in FIG. 4 will be described below.

The BD signal 111 from the beam detector 109 is formed as a pulse wave corresponding to one pulse of the system clock 124 by a waveform shaping circuit 123. The shaped BD signal is used to count a main scanning counter 122. The main scanning counter 122 counts up in synchronization with the system clock 124, and is cleared each time one pulse of the BD signal is supplied. That is, the position at which the laser beam 107 scans presently in the widthwise direction of sheet 112 can be found by detecting the value of the main scanning counter 122.

An unblanking start signal generating shift register 115 and an unblanking completion signal generating shift register 116 latch unblanking start data and unblanking completion data through data lines 127 and 128, respectively. Strobe pulses 125 and 126 are pulses used to latch the two registers 115 and 116. The contents latched by the registers 115 and 116 and the content of the main scanning counter are compared by comparators 117 and 118 to output to a flip flop 121 an unblanking start signal 129 through a gate 119 and an unblanking completion signal 130 through a gate 120.

An unblanking signal 114 is formed from these signals, as shown in FIG. 5.

The image mask signal 113 can also be formed by the same circuit structure as the unblanking signal 114 except that numerical values latched by the registers 115 and 116 are different.

In the above description relating to FIG. 1, it was simply stated that the laser unit 102 is turned on/off by the image signal 101, but it is, in fact, necessary to logically combine the image mask signal 113, the unblanking signal 114 and laser forcible lighting signal 131 to obtain the image signal 101 supplied to the laser unit 102, as shown in FIG. 6.

The image signal 101 can thereby be formed for the image area $D_2$ alone. The laser forcible lighting signal 131 is a signal for enabling the controller arbitrarily to turn on the laser.

Next, automatic power control (APC) will be described. The relationship between the current supplied to a laser chip and the optical output varies with respect to individual chips and also varies according to the heat produced by the chip. For these reasons, laser emission cannot be effected by simple open-loop constant-current control. It is therefore necessary to control the laser unit by monitoring the optical output and maintaining a desired optical output level. This control is hereinafter referred to as APC.

APC will be described below in detail.

FIG. 7 is a circuit diagram of a laser control circuit.

This laser control circuit has a constant-current circuit 133, a switching circuit 135, an amplifier 138, and other components.

The constant-current circuit 133 constitutes a voltage/current converter through which a current $I_1$ flows according to a light quantity control signal 134. The switching circuit 135 modulates this current in accordance with the laser lighting signal 132. A laser diode 136 emits light in accordance with the operation of the switching circuit 135. The quantity of light thereby emitted is detected by photodiode 137 which produces a current based on the quantity of light emitted by the laser diode. The current produced by photodiode 137 is converted into a voltage signal by a resistor 140.

The quantity of emitted light extracted as a voltage value is amplified by an amplifier 138 to be output as a light quantity signal 139. A comparator 144 compares the light quantity signal 139 and a voltage output from a reference voltage device 145 and outputs the result of comparison to an up/down counter 143.

In conventional apparatuses, APC is conducted either during the unblanking period or during periods when the controller forcibly lights the laser diode. In this example, it is assumed that the apparatus has been configured to conduct APC during the forcible laser lighting period. Parenthetical references to the unblanking period are used in FIG. 7 to show the alternative configurations.

The up/down counter 143 counts a clock signal CLK when the laser forcible lighting signal 131 (or the unblanking signal 114 in the alternative configuration) is output, and counts up or down according to the comparison result output from the comparator 144. The count value output from the up/down counter 143 is converted into an analog signal by a D/A converter 142. This analog signal is supplied as light quantity control signal 134 to the constant-current circuit 133 through a buffer 141. Thus, the detection output from the photodiode 137 is returned as a feedback current to the laser diode 136 to control the laser diode 136 during the forcible laser lighting period so that the quantity of light from the laser diode 136 is constantly maintained.

FIG. 8 is a flow chart of this APC operation using the laser forcible lighting signal 131.

For this control, the laser forcible lighting signal 131 shown in FIG. 6 is first activated and the light quantity signal 139 is thereafter monitored (step S1). If the quantity of light is smaller than a desired value, the level of the light quantity control signal 134 is increased by one step (step S2) or, if the quantity of light is higher than the level of the light quantity control signal 134 is reduced by one step (step S3). If the quantity of light coincides with the desired value, an unshown connection from comparator 144 signals the controller to terminate the laser forcible lighting signal 131, whereby the APC operation is terminated.

The area scanned with the laser beam during this operation relative to sheet 112 is as indicated by the arrows in FIG. 9.

This kind of APC is effected not only at an initial stage of the image formation operation (in a forward rotation period) but also in a non-recording operation period as between adjacent recording sheets if printing is effected on a plurality of recording sheets successively supplied.

In this process, however, the area between adjacent sheets is irradiated with laser beam and an unnecessary latent image is formed therein. The transfer roller is thereby contaminated and this contamination influences the recording image, that is, it reduces image quality and contaminates the back surface of the recording sheet. The conventional methods for preventing this problem require a complicated sequence of operation of charging the sensitive drum and reduce the throughput.

On the other hand, a method of effecting APC with respect to an area outside the image area as shown in FIG. 10 is possible. This method is used in a case where the desired light quantity level must be ensured every line or where the influence of the method relating to FIG. 9 upon the image formation is prominent. According to this method, the above-mentioned unblanking period and unblanking signal 114 are utilized.

However, the method utilizing the unblanking period entails a problem relating to the response of the light quantity signal 139 if it is applied to a high-resolution or high speed apparatus in which the unblanking period is short. For example, the quantity of light from the laser unit cannot be controlled unless the unblanking period is longer than a period $t_2$ shown in FIG. 11, in which the light quantity signal 139 output converges to an output $P_0$ corresponding to the output from the laser diode 136.

If the unblanking period is increased, the laser light strikes upon an edge or other portions of the polygon mirror 105, and the sensitive drum is irradiated with scattered light thereby caused, resulting in a considerable influence upon the image.

SUMMARY OF THE INVENTION

It is an object of the present invention to provide an image recording apparatus capable of effecting APC in a simple manner without influencing the image even if the scanning speed is high.

It is another object of the present invention to provide an image recording apparatus capable of forming recording images having improved qualities without reducing the throughput.

It is still another object of the present invention to provide an image recording apparatus capable of preventing changes in the gradation of recorded images between pages as well as changes in the line spacing of rows of characters or the like.

These and other objects, features and advantages of the present invention will become apparent from the accompanying drawings and the following description.

In accordance with one aspect of the present invention, these objects are attained by the provision of an image recording apparatus comprising a light beam generator for generating a light beam modulated by an image signal, a light beam deflector for cyclically scanning a surface of a sensitive body with the light beam so generated, a light beam detector for detecting the light beam outside an area for image formation, and a controller for forcibly actuating the light beam generator during an unblanking period in each scanning cycle, wherein the controller is operable to change the unblanking period. A light quantity detector and controller, both operable during the unblanking period, may also be provided, and the unblanking period changed by the controller may be changed in accordance with various image forming operations.

In another aspect of the invention, these objects are achieved through the provision of an image recording apparatus comprising a latent image forming unit for forming a static electricity latent image on a sensitive body, a development unit for developing a toner image from the static electricity latent image, and a transfer unit for transferring the toner image so formed, wherein a transfer bias of a polarity opposite to a development bias is applied to the transfer unit during the period when the transfer unit is positioned at a non-toner-image formation area between successive toner images.

DESCRIPTION OF THE PREFERRED EMBODIMENTS

First Embodiment

Figure 12:
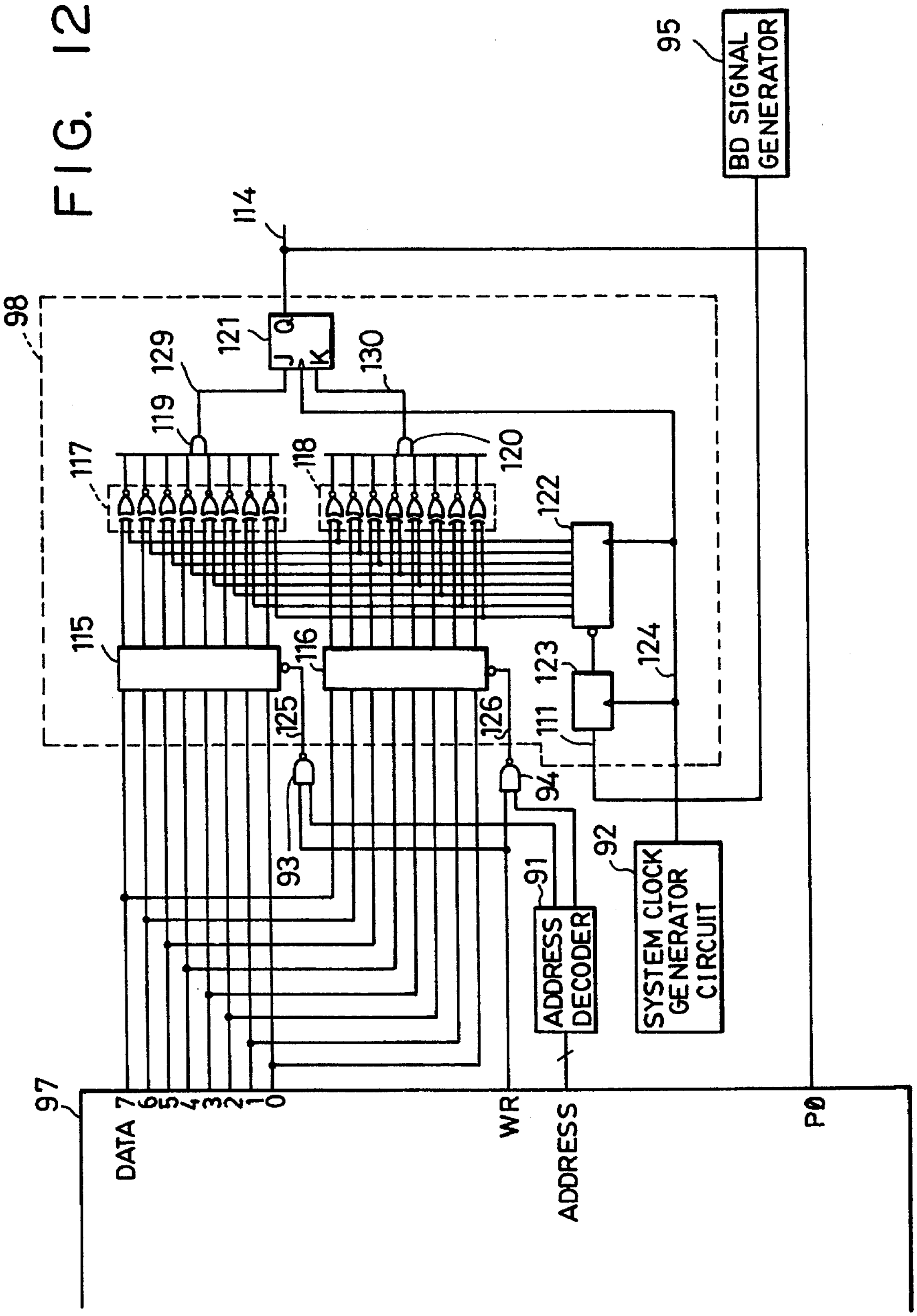
FIG. 12 is a diagram of an unblanking signal generation circuit for use in a first embodiment of the present invention.

FIG. 12 shows the construction of a circuit including a section 98 for generating unblanking signal 114 in accordance with the first embodiment of the present invention. Components of this circuit corresponding to those of the above-described conventional arrangement are indicated by the same reference characters. Other parts of the construction of this embodiment unillustrated are equal to those of the conventional arrangement.

Figure 4:
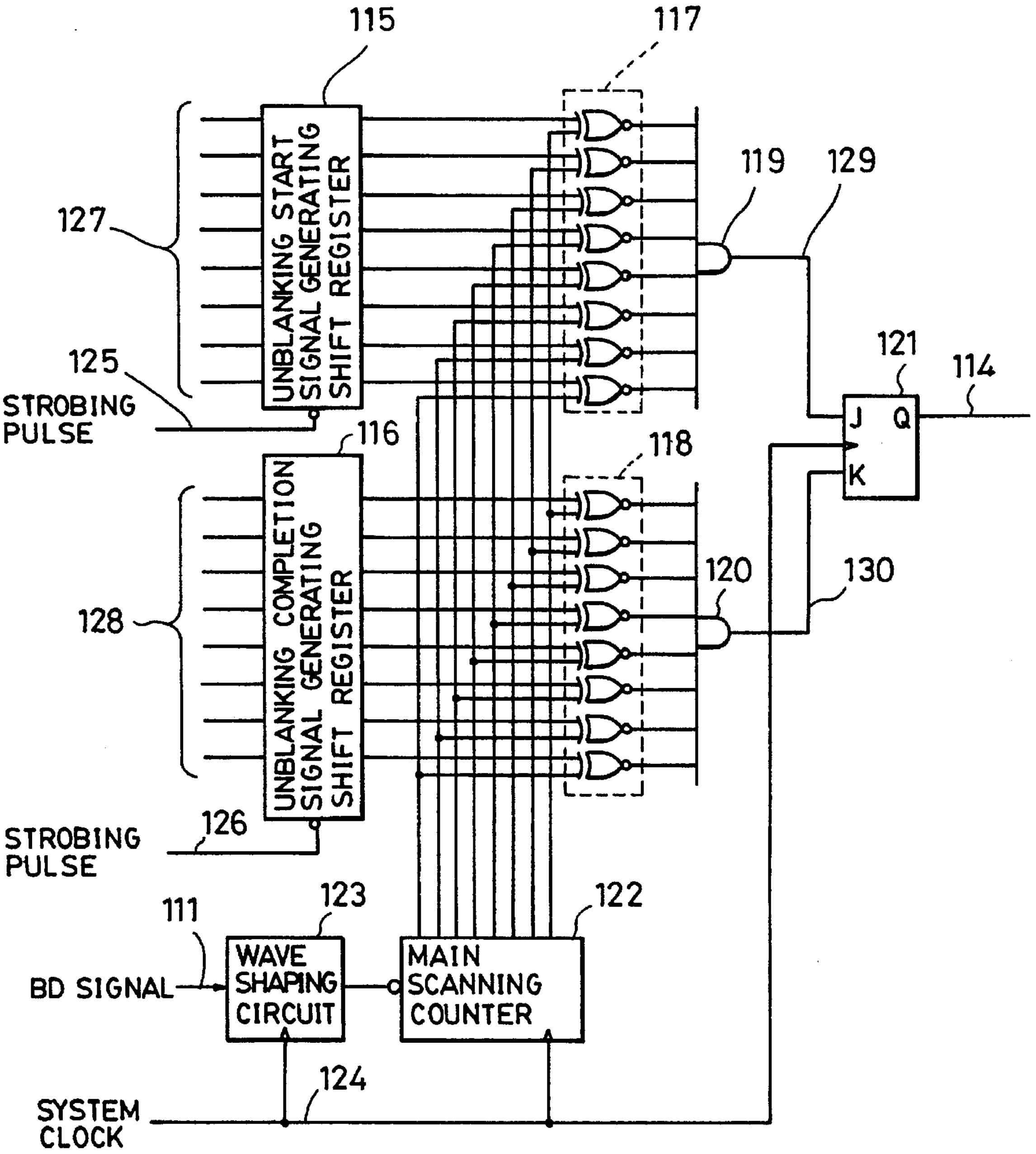
FIG. 4 PRIOR ART
FIG. 4 is a diagram of an example of a circuit for generating an unblanking signal.
Figure 5:
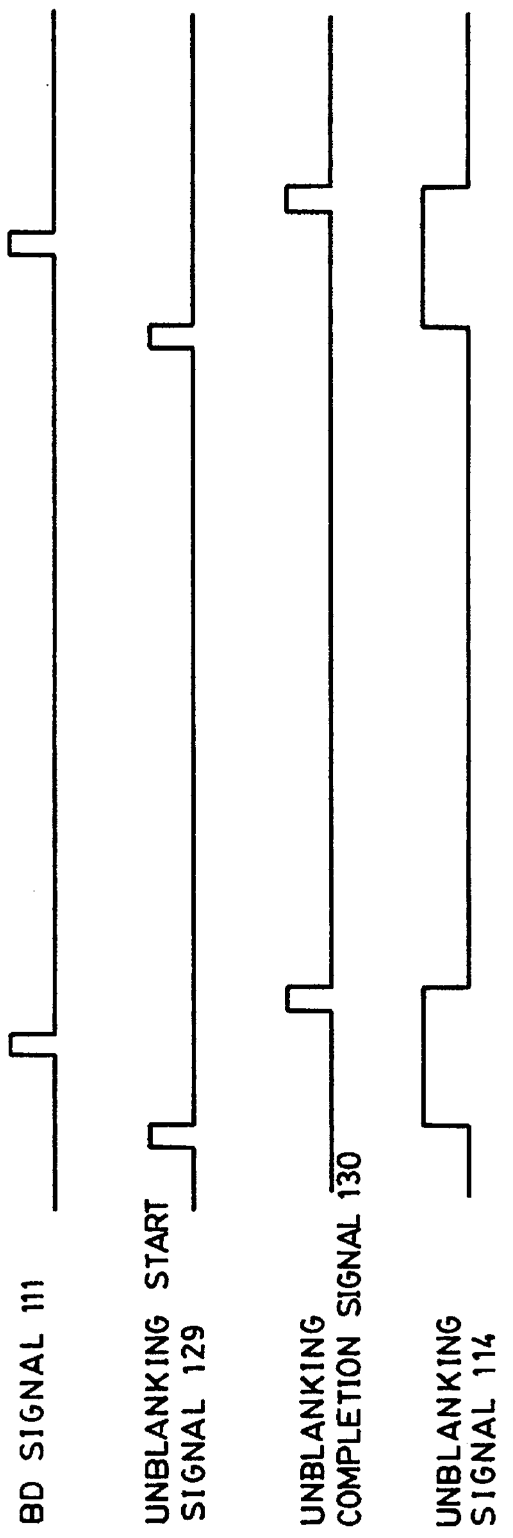
FIG. 5 PRIOR ART
FIG. 5 is a timing diagram of the circuit shown in FIG. 4.
Figure 6:
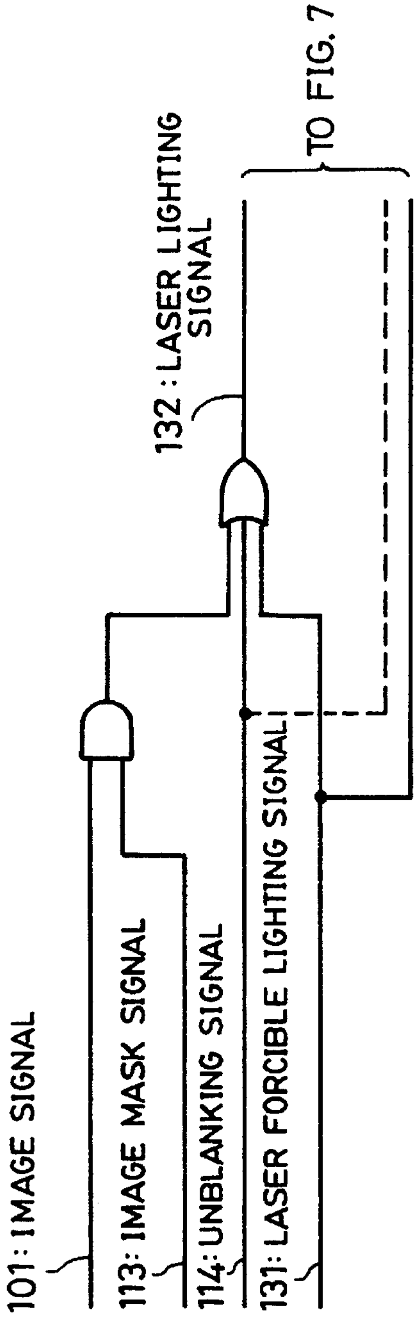
FIG. 6 PRIOR ART
FIG. 6 is a diagram of an example of a conventional circuit for generating a laser lighting signal.
Figure 7:
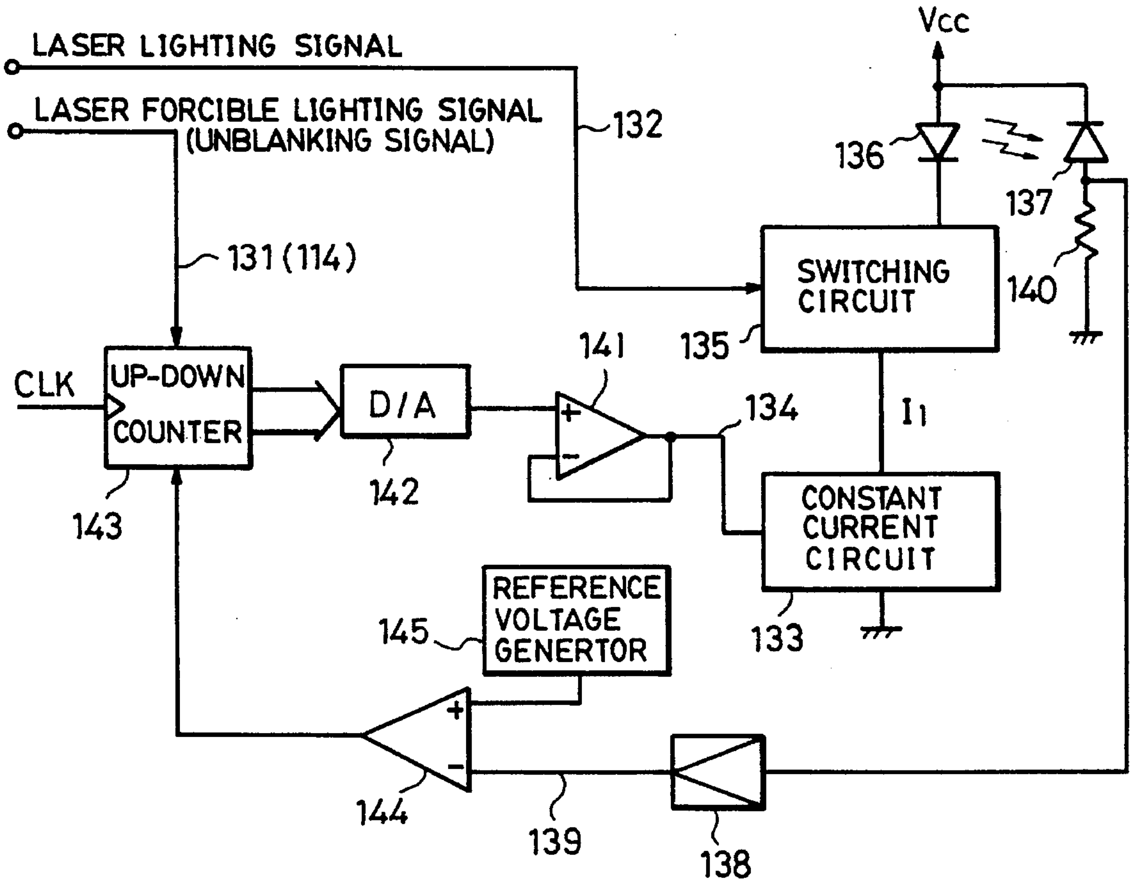
FIG. 7 PRIOR ART
FIG. 7 is a block diagram of a conventional APC circuit.
Figure 8:
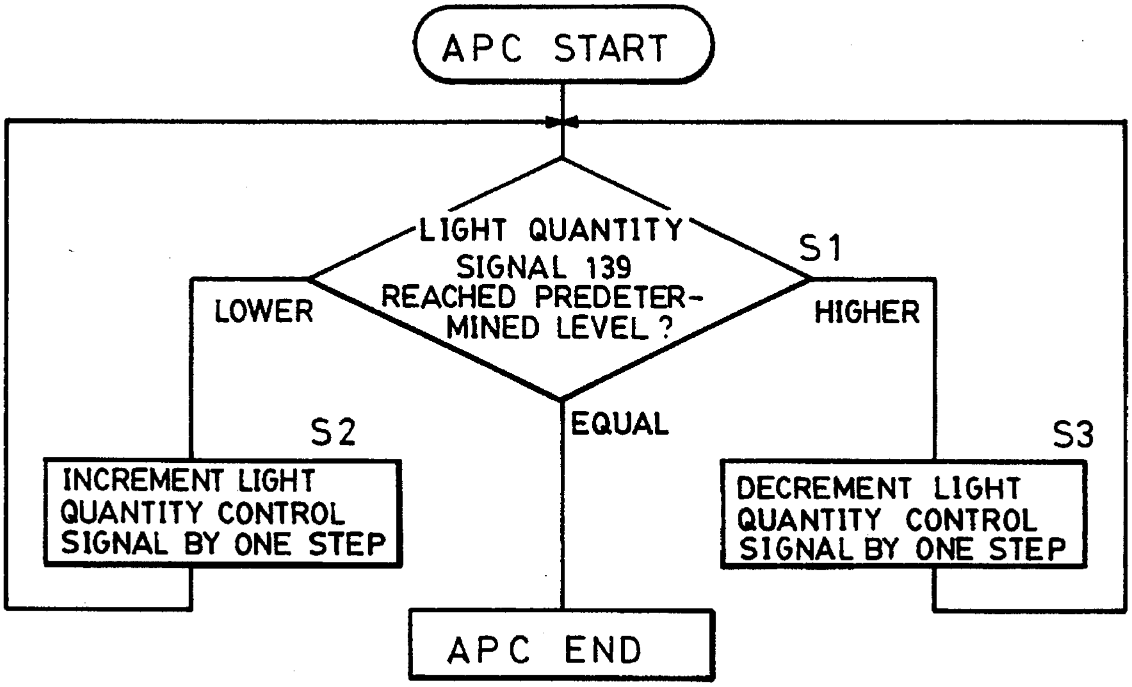
FIG. 8 PRIOR ART
FIG. 8 is a flow chart of the operation of the APC circuit of FIG. 7.
Figure 9:
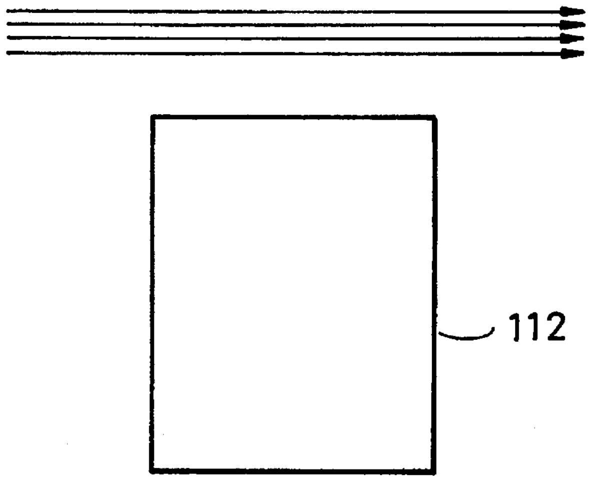
FIG. 9 PRIOR ART
FIG. 9 is a diagram of a conventional continuous APC operation during a forward rotation period.
Figure 10:
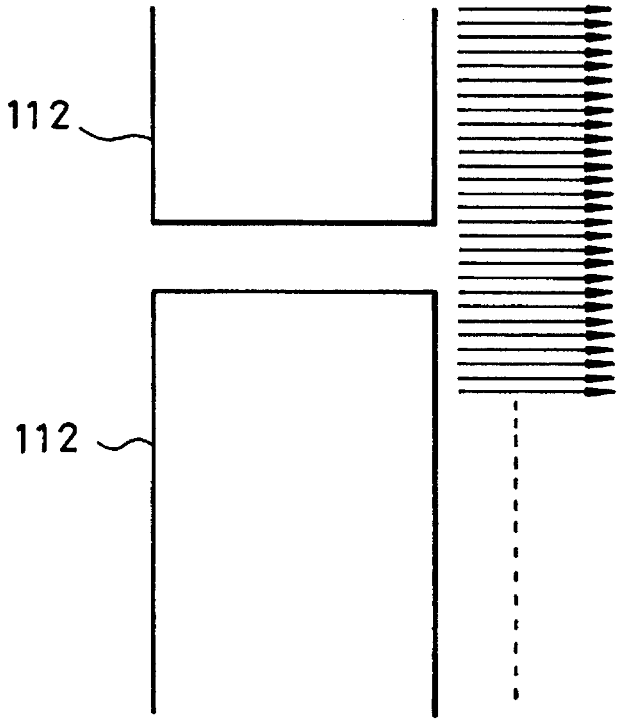
FIG. 10 PRIOR ART
FIG. 10 is a diagram of a conventional unblanking APC operation.

The unblanking signal generation section 98 shown in FIG. 12 performs the same operation as the above-described operation (FIG. 4).

A CPU 97 sets data in an unblanking start signal generating register 115 and an unblanking completion signal generating register 116. An address decoder 91 and AND gates 93 and 94 serve to generate strobe pulses for this data setting. A system clock generating circuit 92 and a BD signal generator 95 are also provided.

Figure 13:
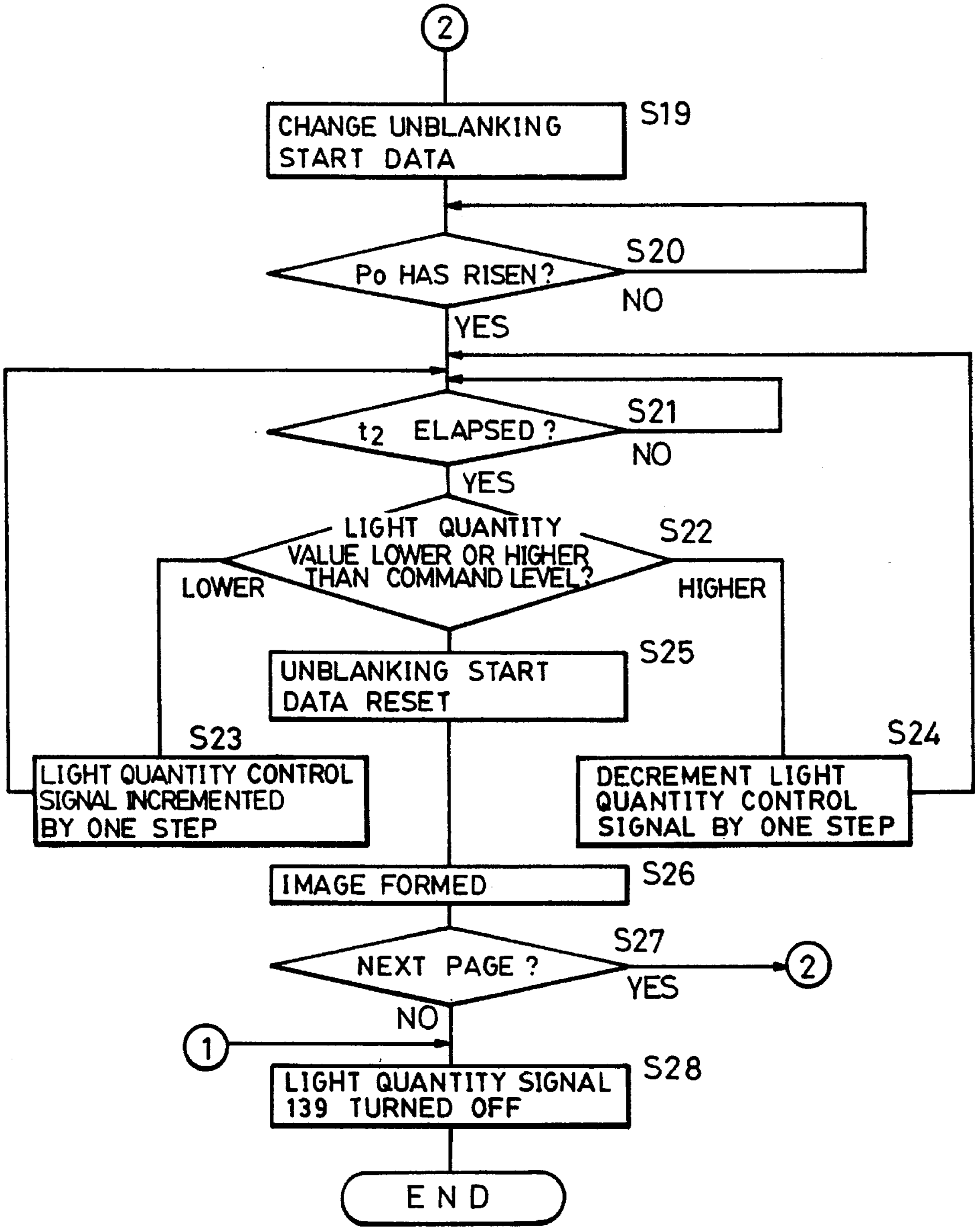
FIG. 13 is a flow chart of the operation of the first embodiment of the present invention.

FIGS. 13(1) and 13(2) show a flow chart of the operation of this embodiment. Parts of the operation unrelated to the features of this embodiment are omitted in flow chart.

After the start of image formation, unblanking start data (UBS1) is set (step S10). This data comprises a value corresponding to an unblanking start position 29*a* shown in FIG. 14. Then unblanking completion data (UBE) is set (step S11). This data comprises a value corresponding to an unblanking completion position 30 shown in FIG. 14.

Figure 11:
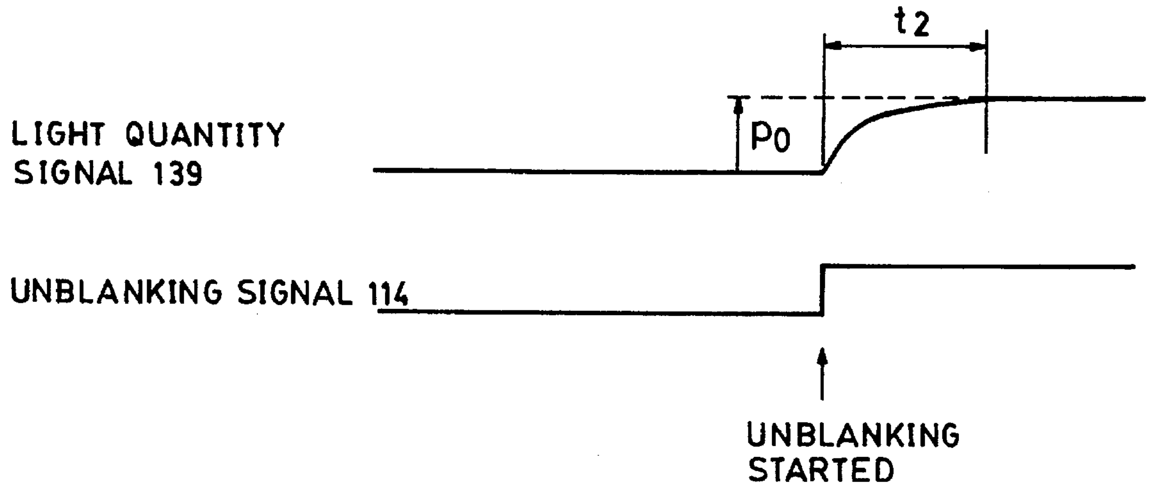
FIG. 11 PRIOR ART
FIG. 11 is a diagram of a timing relationship between unblanking signal 114 and light quantity signal 139.

Next, laser forcible start signal 131 is turned on (step S12). However, at this time point, light quantity control signal 134 is not on and no current flows through the laser diode 136 to effect laser emission. In this state, light quantity control signal 134 is increased one step (step S13). Thereafter, there is a delay of $t_2$ (step S14) in order to ensure the time taken to change light quantity control signal 134 and, hence, the quantity of light from the laser diode 136 in the system shown in FIG. 11 and to complete the change in the amplifier 138.

Thereafter, determination is made as to whether or not light quantity signal 139 has reached a predetermined level (step S15). If the predetermined level is not reached, the operation of increasing light quantity control signal 134 one step and checking the quantity of light (steps S13, S15) is repeated until the light quantity signal 139 reaches the predetermined level.

When the laser diode 136 starts emitting light at the required quantity of light, laser forcible lighting signal 131 is turned off (step S16). The laser diode 136 thereafter emits no light so long as image signal 101 is not input. At this time point, this apparatus is ready to perform an image formation operation.

Next, an image is formed based on image signal 101 supplied from the outside (step S17) and determination is then made as to whether or not a second page exist (step S18). If there is no second page, light quantity signal 139 is turned off and the process is terminated (step S28).

Figure 14:
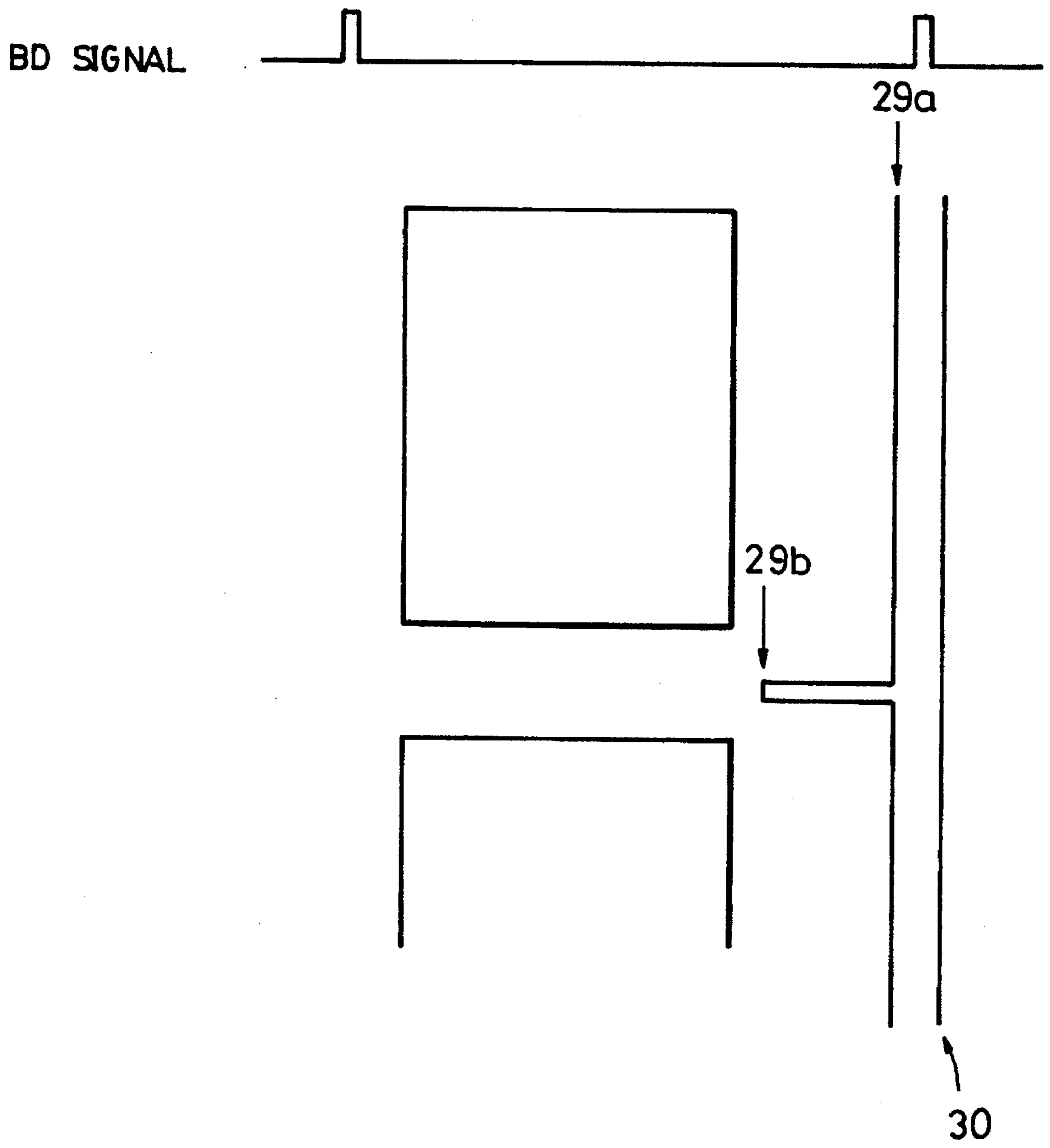
FIG. 14 is a diagram of APC operation in accordance with the first embodiment of the present invention.

If there is a second page, data (UBS2) corresponding to a second unblanking start position 29*b* shown in FIG. 14 is set as unblanking start data (step S19). The input of unblanking signal 121 is awaited (step S20). When unblanking signal 121 is input, there is a delay of $t_2$ for the same purpose as mentioned above (step S21) and the light quantity value is compared with the target value (step S22).

If the light quantity value is larger than the target value, light quantity control signal 134 is reduced one step (step S24). If the light quantity value is smaller than the target value, light quantity control signal 134 is increased one step (step S23). This processing is repeated until the light quantity value becomes equal to the target value.

When the light quantity value becomes equal to the target value, the value of the unblanking start data is reset to the first value (UBS1) (step S25), and image formation processing is thereafter conducted (step S26). It is thereby possible to eliminate the risk of the image being influenced by scattered light caused when the laser light strikes upon an edge of the polygon mirror 105 during the image formation period.

Thereafter, a determination is made as to whether or not next page image formation is required (step S27). If YES, the process returns to effect APC. If NO, light quantity signal 139 is turned off (step S28).

This process enables precise laser light quantity control and formation of high-quality images.

Second Embodiment

In the first embodiment, the CPU 97 effects APC by synchronization with the timing of the unblanking signal based on a software program. Alternatively, APC may be achieved by a hardware construction in accordance with the second embodiment of the present invention.

Figure 15:
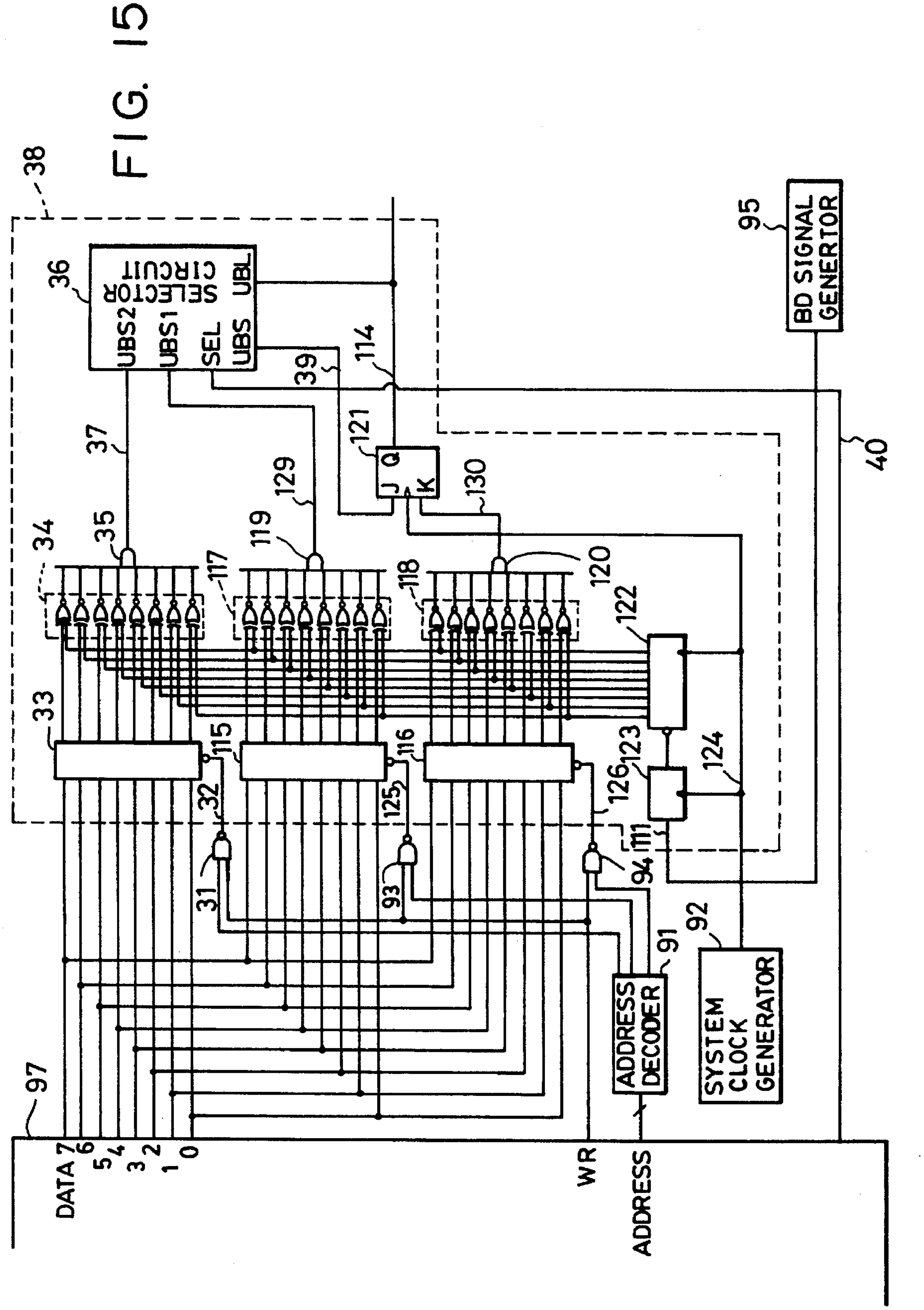
FIG. 15 is a diagram of an unblanking signal generation circuit for use in a second embodiment of the present invention.

FIG. 15 shows a circuit in accordance with the second embodiment.

In the hardware-based APC construction shown in FIG. 15, an unblanking signal generating section 38 is a circuit for changing the width of the unblanking signal based on a paper interval signal 40 generated by CPU 97 and representing the interval between adjacent recording sheets.

The CPU 97 sets data (UBS2) corresponding to an unblanking start position between adjacent sheets in a register 33.

An AND gate 31 serves to generate a strobe pulse for this data setting. The AND gate 31 outputs a strobe pulse from write pulse WR supplied from the CPU 97 and a signal supplied from from the address decoder 91.

In a similar manner, registers 115 and 116 latch unblanking start data (UNS1) and unblanking completion data (UBE).

This embodiment is the same as the first embodiment with respect to the main scanning counter 122, the waveform shaping circuit 123 and the system clock generating circuit 92.

A selection circuit 36 is provided which serves to select either unblanking start data UBS1 or UBS2 based on selection signal 40 (SEL). The selected data is output from selection circuit 36 at UBS.

Figure 16:
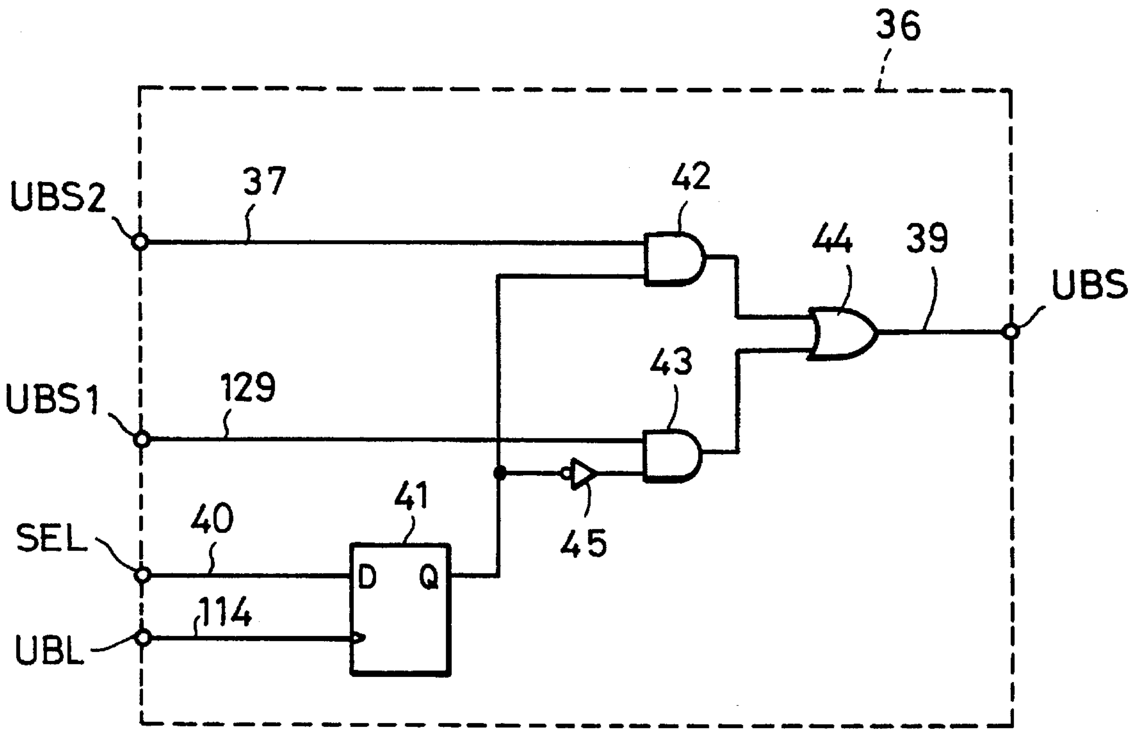
FIG. 16 is a diagram of the selection circuit 36 provided in the circuit shown in FIG. 15.

FIG. 16 shows details of the selection circuit 36.

The CPU 97 turns on the paper interval signal 40 at a position corresponding to the paper interval (which may be the position at which APC is effected as between adjacent sheets). In this circuit, a latch 41 is used to set a sync signal for synchronization of the unblanking start signal changeover operation with the unblanking start signal. That is, UBS2 and UBS1 are changed over with respect to signal levels "H" and "L" output from the latch 41.

This method reduces the load on the CPU 97 and enables APC to be easily performed during the unblanking period.

In the above-described embodiments, the unblanking signal start position is changed. However, the unblanking end position may also be changed to enable APC during paper interval unblanking for high-speed scanning. Also, the unblanking start position 29*b* shown in FIG. 14 may be changed according to the sheet size. In this case, a conventional sheet size detection means may be provided and the CPU 97 may set data in the registers 33, 115, or 116 according to the detection output from the sheet size detection means.

Third Embodiment

Figure 17:
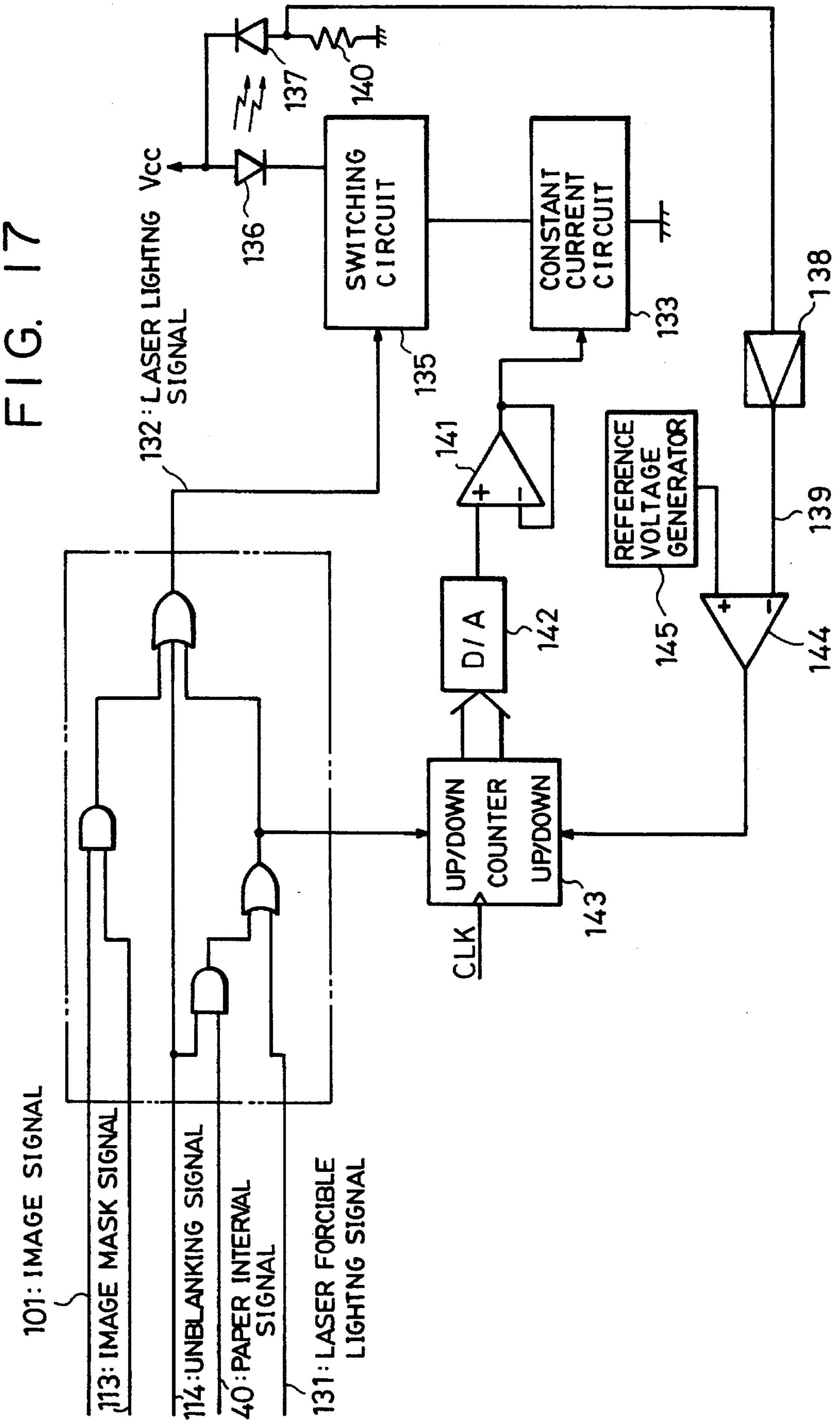
FIG. 17 is a diagram of an APC circuit in accordance with a third embodiment of the present invention.

FIG. 17 is a block diagram of the construction of an automatic optical output control circuit of an image recording apparatus in accordance with the third embodiment of the present invention.

In a laser beam printer in accordance with the image recording apparatus of the present invention, the laser forcible lighting signal 131 is set as "True" to continuously light the laser diode 136 in order that the laser is lighted irrespective of image synchronization when the power source is turned on or at the time of forward rotation. Simultaneously, the up/down counter 143 starts counting from an initial value previously set because the laser forcible lighting signal 131 is "True".

The photodiode 137 detects light emergent from the laser diode 136, and returns the detection signal as a feedback signal to the comparator 144 through the amplifier 138. The comparator 144 compares the output voltage of the amplifier 138 with the reference voltage produced by the reference voltage generator 145. If the output voltage of the amplifier 138 is lower than the reference voltage, the output from the comparator 144 causes the up/down counter 143 to count up, and the counter 143 counts up the value output to the D/A converter 142. The output from the D/A converter 142 is supplied to the constant-current circuit 133 through the buffer 141, thereby increasing the current supplied to the laser diode 136.

When the output voltage of the amplifier 138 becomes equal to the reference voltage, the laser forcible lighting signal 131 is set as "False" to maintain the counter 143 in the holding state. The laser diode 136 is constant-current driven by the current thereby held, thereby effecting image exposure for a first page.

At a paper interval time after completion of image exposure for the first page, a paper interval signal 40 is set as "True". When unblanking signal 174 is also "True", the associated AND gate also goes "True", thereby enabling up/down counter 143 and lighting laser diode 136 in the same manner as described above.

The photodiode 137 detects the intensity of the optical output from the laser diode 136, and returns the detection voltage as a feedback signal to the comparator 144 through the amplifier 138. The comparator 144 compares the output voltage of the amplifier 138 with the reference voltage produced by the reference voltage generator 145.

If the output voltage of the amplifier 138 is lower than the reference voltage, the output from the comparator 144 causes the counter 143 to count up the value output to the D/A converter 142. The output from the D/A converter 142 is supplied to the constant-current circuit 133 through the buffer 141, thereby increasing the current flowing through the laser diode 136.

If the output voltage of the amplifier 138 is higher than the reference voltage, the output from the comparator 144 is determined by the logic inverse to that in the above case, so that the counter 143 counts down to reduce the current supplied to the laser diode 136.

The period of the clock input CLK of the up/down counter 143 is set longer than the response time of the feedback circuit. During paper interval unblanking APC, therefore, the current flowing through the laser diode 136 may be only corrected by minimum order bits with respect to each scanning line since the quantity of light is generally controlled during the above-mentioned on period of the laser forcible lighting signal 131. Thus, light quantity control is thereby effected during the unblanking period which is comparatively short.

After the optical output output intensity correction has been completed, the paper interval signal 40 is set as "False, the counter 143 is set in the holding state, and the laser diode 136 is constant-current driven by the current thereby held, thereby effecting image exposure for a second page.

With respect to paper intervals of the second and subsequent pages, paper interval unblanking APC is also effected as in the case of the paper interval between the first and second pages, and the variation in the optical output intensity due to the increase in the temperature of the laser and other factors is corrected.

An example of application of the image exposure apparatus shown in FIG. 18 to a laser printer such as that shown in FIG. 2 will be described below.

Figure 2:
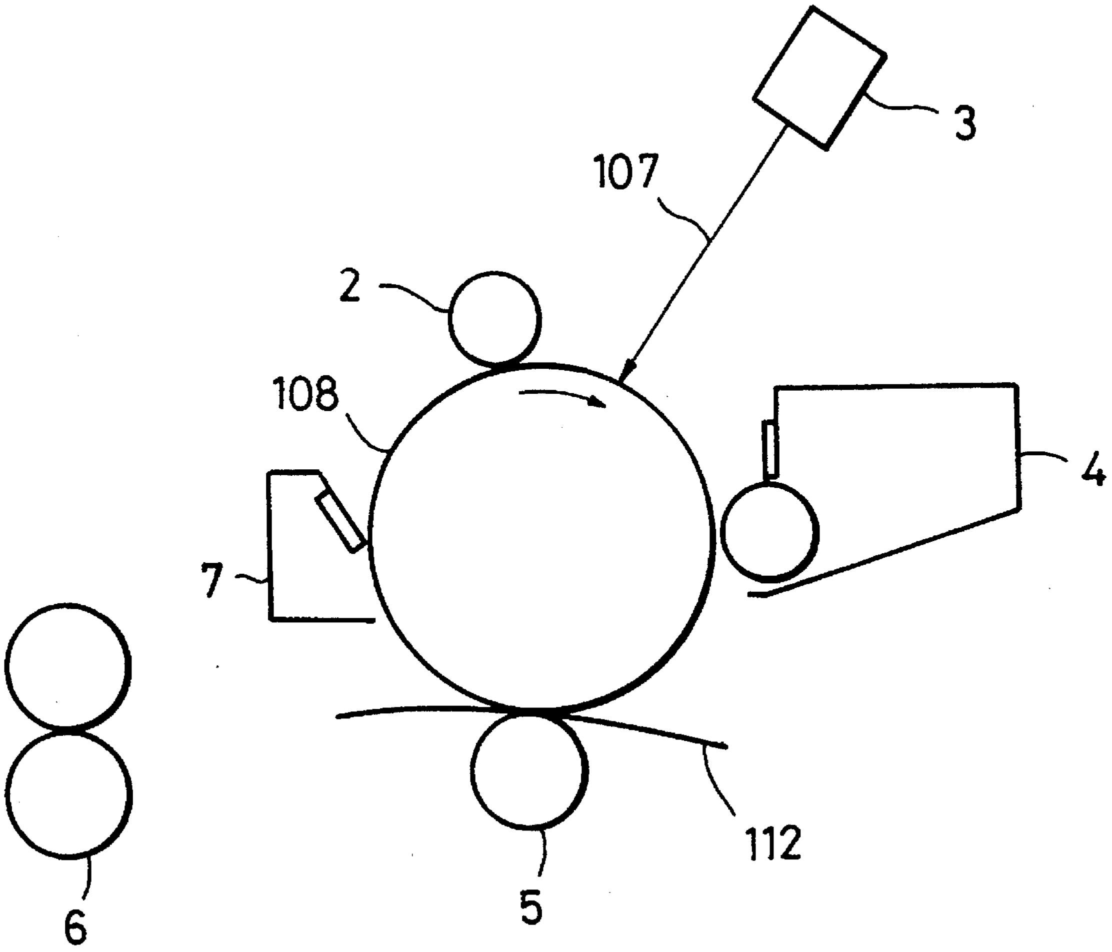
FIG. 2 PRIOR ART
FIG. 2 is a schematic cross-sectional view of the laser beam printer shown in FIG. 1.
Figure 3:
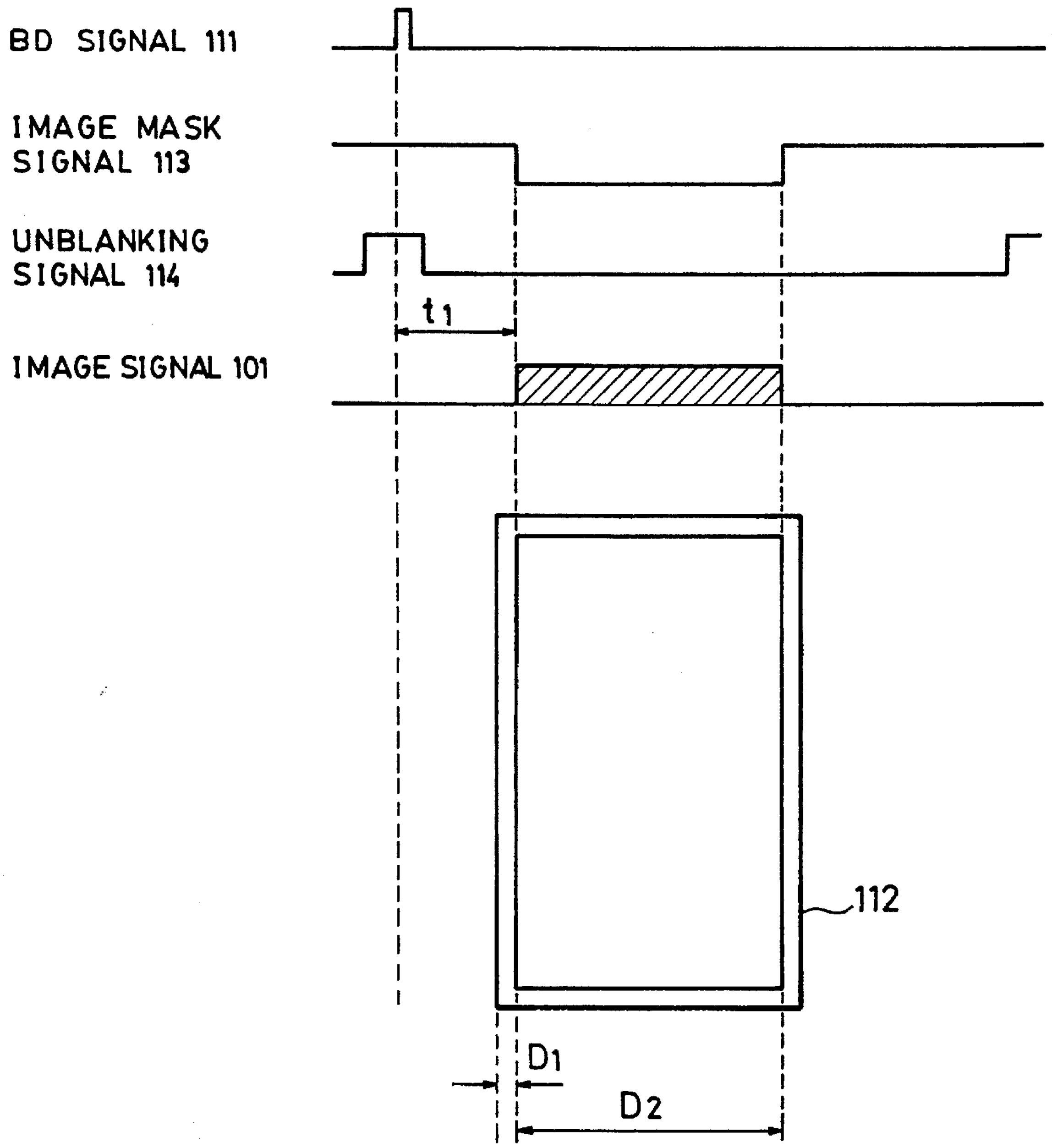
FIG. 3 PRIOR ART
FIG. 3 is a diagram of image forming operation of the laser printer shown in FIG. 1.

Referring to FIG. 2, when forward rotation is started, the sensitive drum 108 formed of an aluminum cylinder which has a diameter of 30 mm and to which an OPC sensitive material is applied is rotated at a process speed of 47 mm/sec and is uniformly charged at −600 V by the charging roller 2 which is formed of an electroconductive elastic material.

During forward rotation, APC of continuous lighting is effected, the sensitive drum 108 is scanned with the light from the laser diode 136, and a latent image is thereby formed on the sensitive drum 108. When this latent image is developed by a negatively changed toner of the development device 4, unnecessary part of the toner is attached to the sensitive drum 108, thereby contaminating the transfer roller 5. According to this embodiment, this problem is solved by a method described below.

If a bias of a polarity (minus) such that the toner on the transfer roller 5 is transferred to the sensitive drum 108 is applied to the transfer roller 5, the toner contamination of the transfer roller 5 is not attached to the back surface of the transfer sheet. However, if this method is applied to continuous lighting paper interval APC, the throughput is considerably reduced because of the means for transferring the attaching toner to the sensitive drum 108. Unless the toner is transferred to the sensitive drum 108, the toner appears as a contamination on the back surface of the next transfer sheet. In contrast, in a case where continuous lighting APC is effected during forward rotation as in this embodiment, the throughput is not reduced although the toner attached to the transfer roller 5 is transferred to the sensitive drum 108, thereby enabling the surface of the transfer roller 5 to be sufficiently cleaned.

Figure 18:
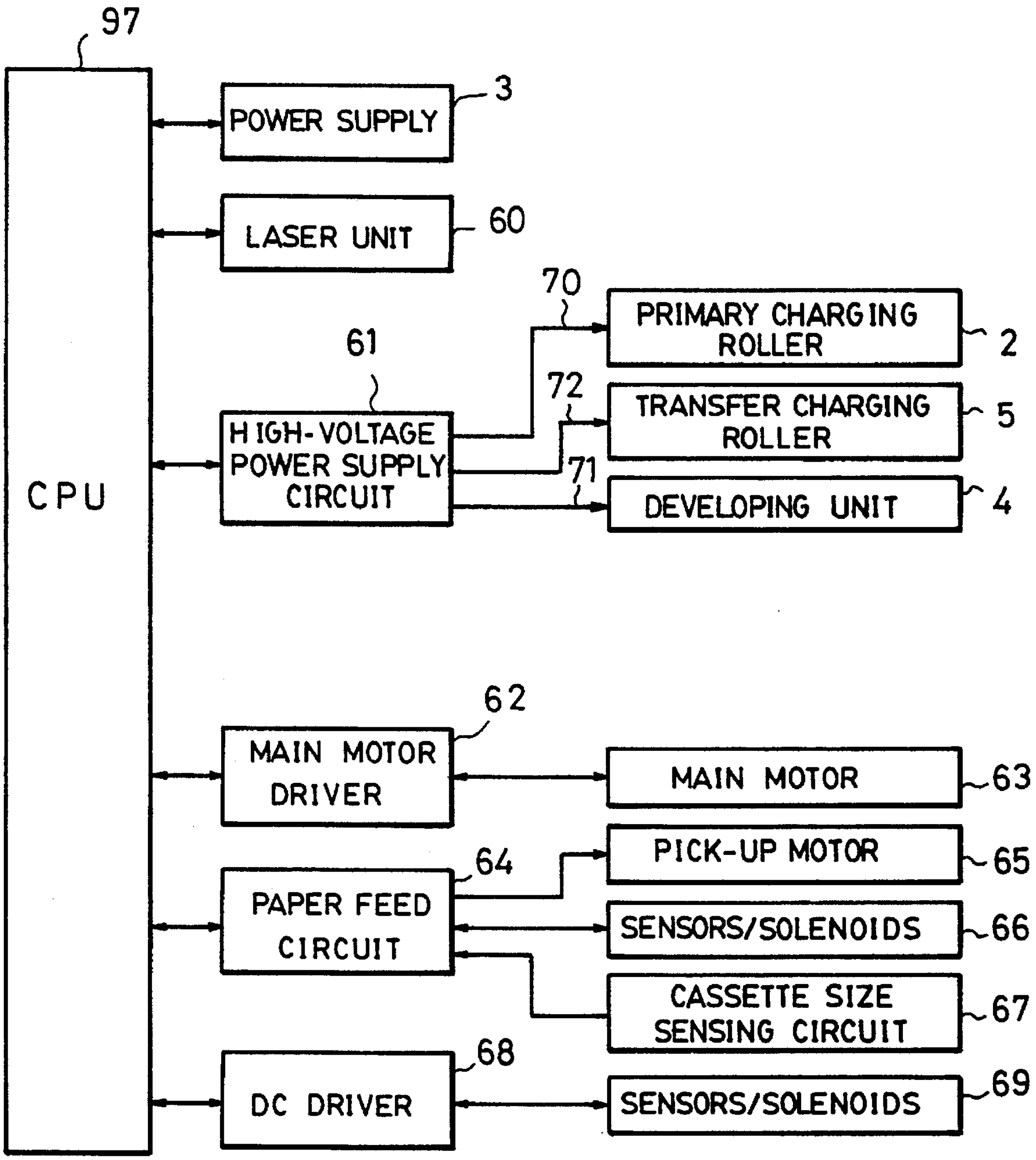
FIG. 18 is a block diagram of the electrical construction of a laser beam printer to which the third embodiment is applied.
Figure 19:
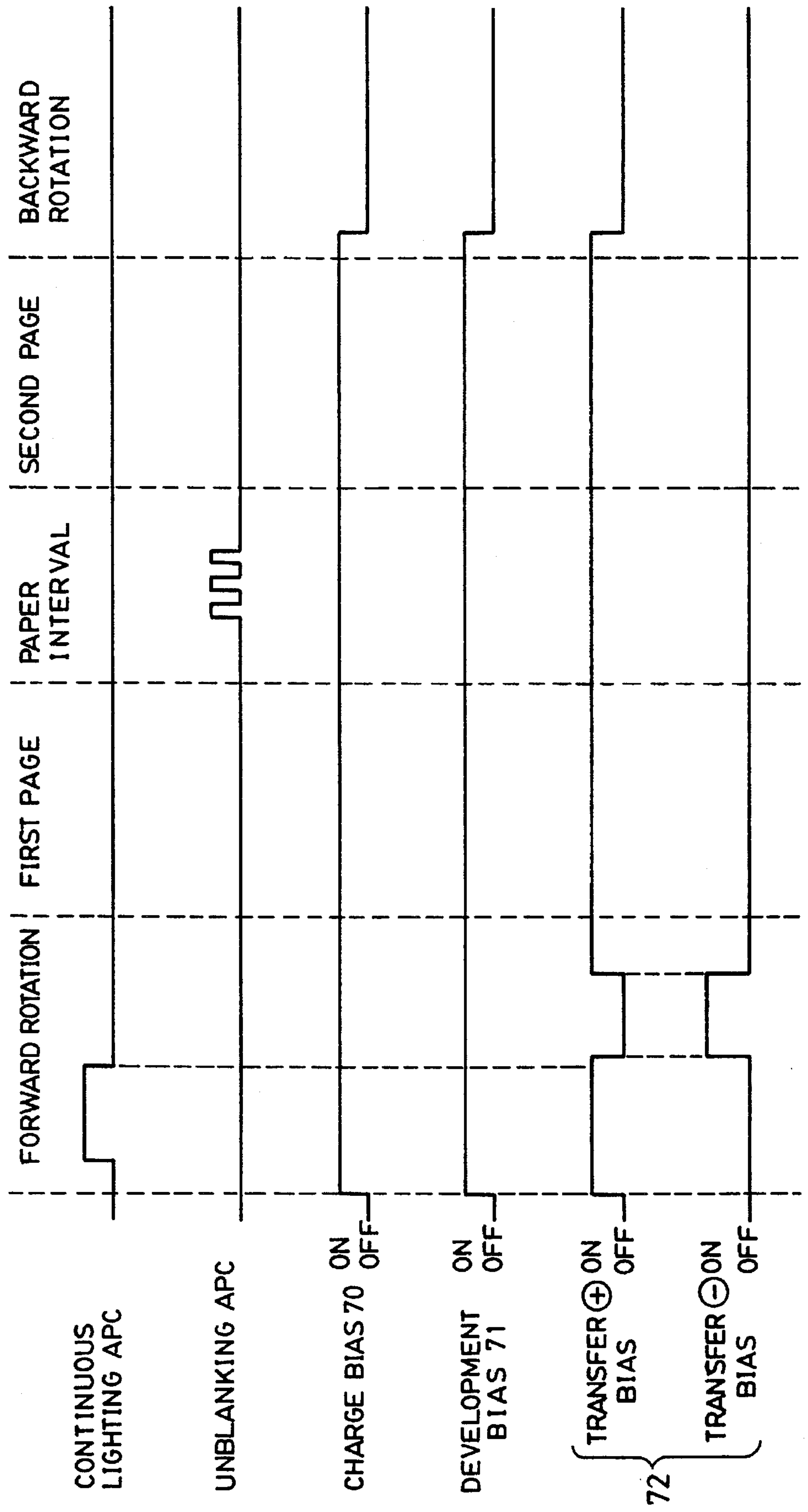
FIG. 19 is a diagram of timing in accordance with the third embodiment.

FIG. 18 shows a system for effecting this operation and FIG. 19 shows a diagram of the timing of the operation of this system.

A laser unit 60 shown in FIG. 18 includes an arrangement for effecting the above-described light quantity control. A high voltage is supplied from a high voltage power supply circuit 61 to the primary charging roller 2, the charged transfer roller 5 and the development device 4, as described later. A main motor 63 for rotating the sensitive drum 108 and other members is driven by a driver 62. A pick-up motor 65, sensors/solenoids 66, and a cassette size sensing circuit 67 are connected to a paper feed circuit 64. A DC driver 68 drives the sensors/solenoids 66.

In this embodiment, as shown in FIG. 19, continuous lighting APC is effected during forward rotation, and unblanking APC is effected during the paper interval period. When continuous lighting APC is effected, the laser is lighted so that a toner image is formed on the sensitive drum 108. Sensitive drum 108 continues to be rotated by main motor 63 so that after a period of time, the toner image is at the position of the transfer roller 5. At this time, CPU 97 sets the transfer bias 72 to a polarity opposite to the normal polarity. Transfer of the toner image to the transfer roller 5 is thereby prevented.

Figure 20:
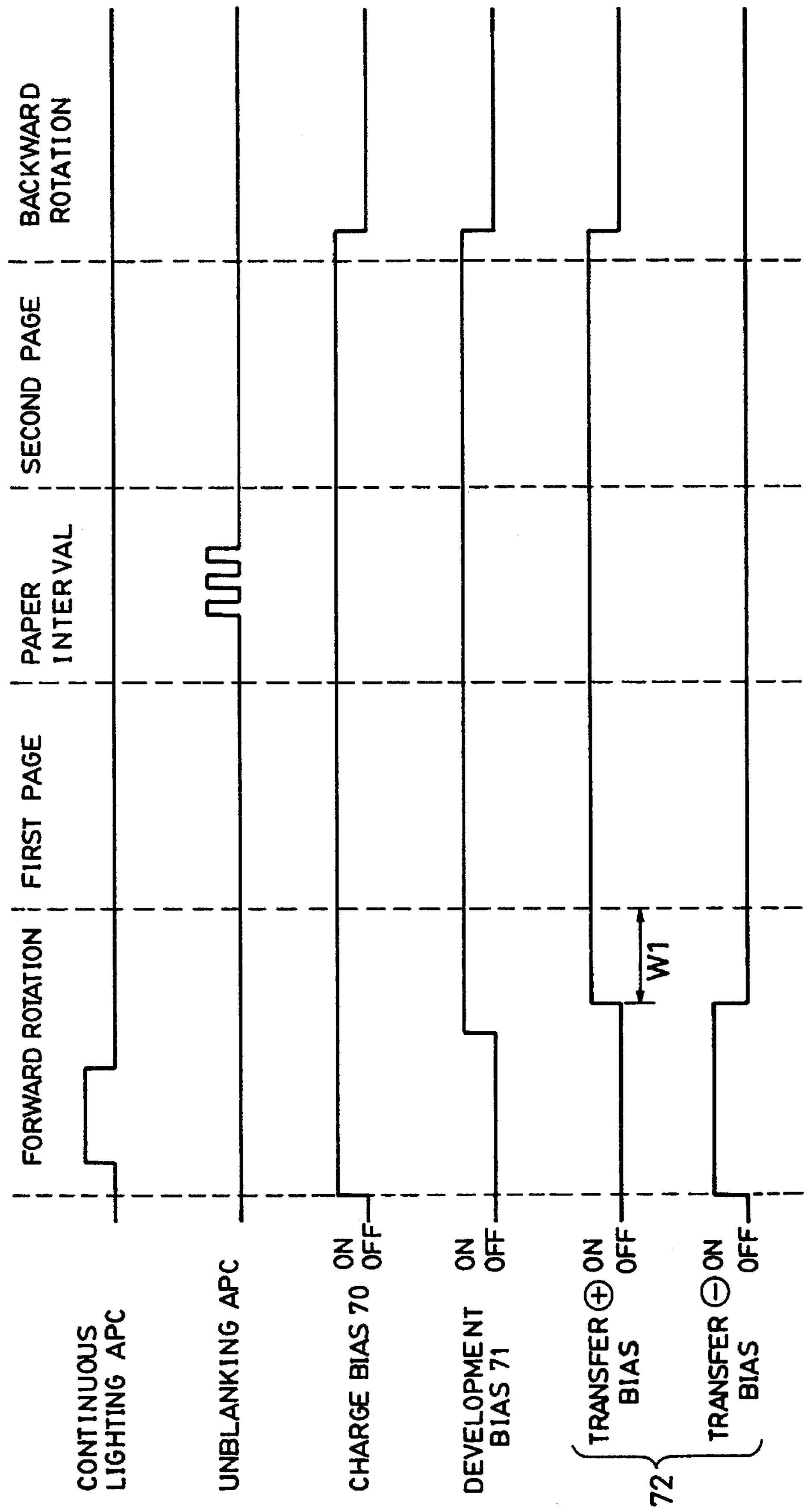
FIG. 20 is a diagram of operation timing for a modification of the third embodiment of the present invention.

The system shown in FIG. 18 may also be operated as shown in FIG. 20. In this case, the development bias is turned off to stop development with respect to the toner image formed by continuous lighting APC. Ordinarily, if a positive transfer bias is applied when an undeveloped image passes through the transfer position, a memory (a portion which is not uniformly changed by primary charging) occurs on the sensitive drum 108 in correspondence with the latent image.

If the transfer bias is made negative to prevent occurrence of such a memory, a part the toner charged with the opposite polarity (positive polarity) is attached to a non-exposed portion of the latent image formed by continuous lighting APC. This part of the toner is transferred to the transfer roller 5. If this toner is cleaned during the paper interval period, the throughput is reduced. During forward rotation, however, the transfer roller 5 can be cleaned in a period W1 by applying a positive bias at the time when the portion of the transfer roller 5 to which the toner is attached faces the sensitive drum 108, as in this embodiment.

In the above-described example, charging the sensitive drum 108 is started when forward rotation is started. Alternatively, the arrangement may be such that at the start of the forward rotation, charging is not started while continuous lighting APC is effected with respect to uncharged portion of the sensitive drum 108, and that charging is started after the completion of APC. In this case, the above-described problem is prevented and the increase in the forward rotation time required by this method is about 0.3 m second at most, which is negligible.

Thus, continuous lighting APC can be effected during forward rotation without any problem.

When the laser diode 136 driving current for obtaining the target optical output intensity is held by continuous lighting APC during forward rotation, the laser beam image-modulated at a density of 300 dpi is projected on the charged surface by the image exposure unit 3, and the potential of irradiated portions is reduced so that a static electricity latent image is formed.

When this static electricity latent image is moved to the development position on the development device 4 at which it faces the sensitive drum 108, negatively charged toner is supplied from the development device 4 to be attached to the latent image portions, thereby forming a toner image. There is no possibility of occurrence of any considerable gradation non-uniformity at the time of development because the laser diode 136 is constant-current driven during the image exposure period.

When the toner image is moved to the transfer position, i.e., a press-contact nip between the sensitive drum 108 and the transfer roller 5 having a diameter of 20 mm and maintained in pressure contact with the sensitive drum 108, the transfer sheet 112 is also transported to the transfer position in synchronization with the toner image movement. Simultaneously, a positive transfer bias is applied to the transfer roller 5 to transfer the toner image on the sensitive drum 108 to the transfer sheet 112.

Thereafter, the transfer sheet 112 is separated from the sensitive drum 108, and the toner image is fixed on the transfer sheet 112 by the fixing device 6. On the other hand, a part of the toner left on the sensitive drum 108 is removed by the cleaner 7, and the sensitive drum 108 is used for the next image formation process.

Ordinarily, the transfer roller 5 may be formed of one material prepared by dispersing carbon and the like in chloroprene rubber, NBR, urethane rubber, silicone rubber, or EPDM to set a volume resistivity of $10^5$ to $10^{11}$ Ωcm and a hardness of 20° to 30° (asker-C) or may have a two-layer structure formed by coating a roller formed of this material with an elastomer such as polyvinylidene fluoride, a thermoplastic polyester elastomer, a thermoplastic polyolefin elastomer, a thermoplastic polyurethane elastomer, a thermoplastic polystyrene elastomer, a thermoplastic polyamide elastomer, a thermoplastic fluorine elastomer, a thermoplastic ethylene-vinyl acetate elastomer, or a thermoplastic polyvinyl chloride elastomer, in which an electroconductive filler, such as a metal powder, or a semiconductive filler, such as a titanium compound, a nickel compound, a silicon compound is mixed or whose polymer structure is changed to select a suitable resistance of the elastomer and to set the volume resistivity of the elastomer layer to a range of $10^{11}$ to $10^{15}$ Ωcm.

A specific example of the arrangement shown in FIG. 17 will be described below.

A laser unit having a 5 mW laser diode 136 and a photodiode 137 housed in an integrally formed package having a diameter of 9 mm was used. The reference voltage generator 145 was constituted by a variable resistor for dividing the circuit power supply voltage Vcc. A 12-bit D/A converter was used as the D/A converter 142.

Since there are variations in the far field pattern of emission of the laser diode 136 with respect to the properties of the laser diode 137, the efficiency varies at which divergent light from the laser diode 136 is transmitted through a collimator lens for making this light parallel. Under these conditions, the intensity of the optical output from the laser diode 135 on the chip surface for obtaining the desired quantity of light on the surface of the sensitive drum 108 varied in a range of about 1.5 to 4.0 mW.

If conventional unblanking APC is effected as APC during forward rotation instead of continuous lighting APC of this embodiment, the time taken to obtain the desired optical output is 1.5 sec or more at the maximum. However, the maximum of this time was limited to about 250 msec by continuous lighting APC during forward rotation in accordance with this embodiment.

Unblanking APC exposure for paper intervals was effected in a period of about 150 μsec in BD cycles of about 1.8 msec. Under these conditions, paper interval unblanking APC was completed by one to several main scanning lines.

According to this embodiment, an image exposure unit in which unblanking APC is effected, in which the wait time and the first printing time are short, and which is free from occurrence of any considerable gradation non-uniformity in each page can be provided.

Fourth Embodiment

The fourth embodiment will be described below in which the present invention is applied to the same laser beam printer as the third embodiment, and in which the transfer roller 5 is biased with the same polarity as the toner so as to prevent contamination and eliminate the need for cleaning.

The construction of this embodiment is the same as that shown in FIG. 17.

Figure 21:
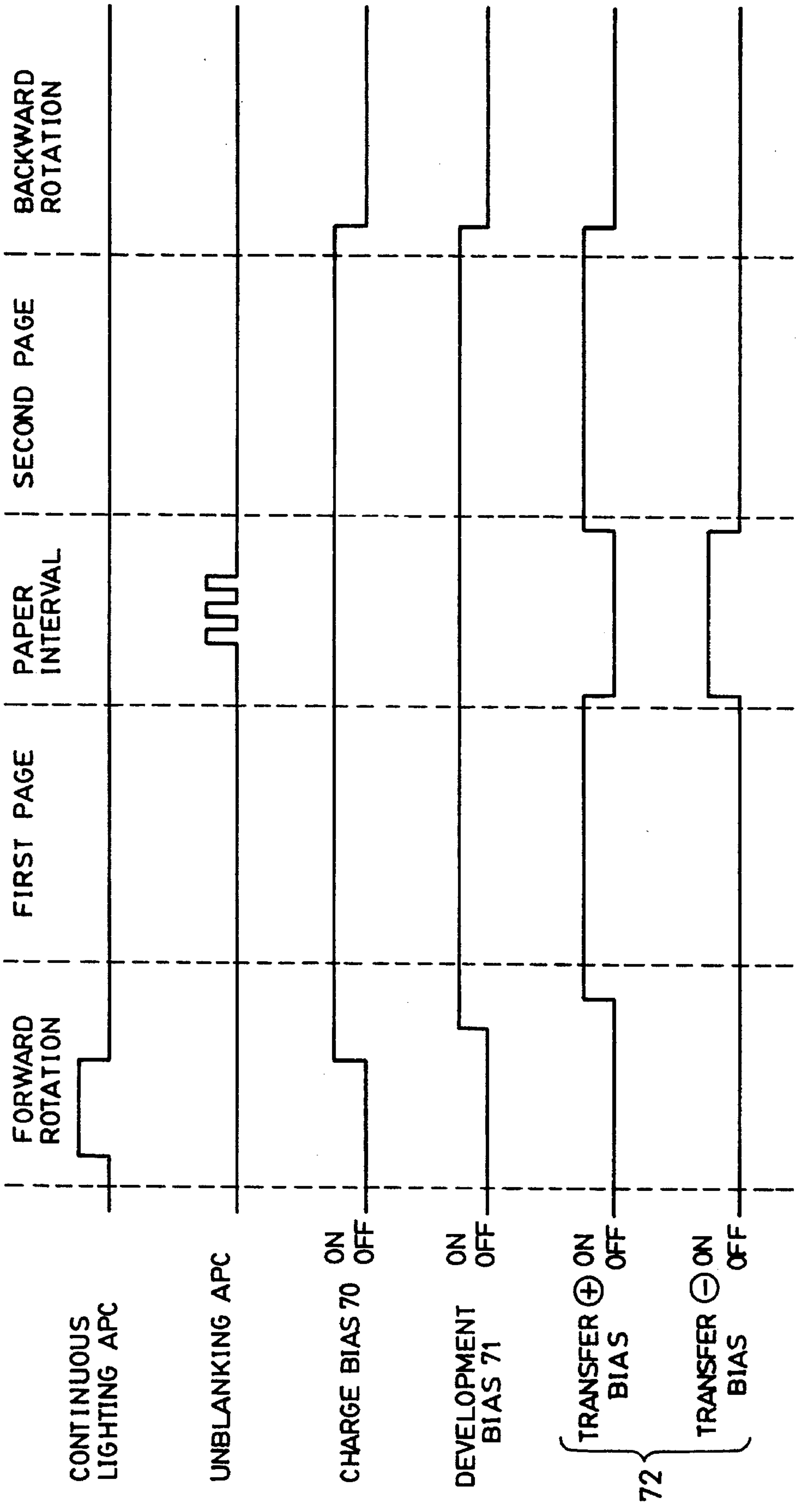
FIG. 21 is a diagram of operation timing in accordance with a fourth embodiment of the present invention.

FIG. 21 shows a time chart of this embodiment. This embodiment will be described below with specific reference to FIG. 21.

The sensitive drum 108 is rotated at a process speed of 47 mm/sec by the main motor or the like to effect forward rotation which is a rotation of preparation for printing. During forward rotation, continuous lighting APC is effected to set the intensity of the optical output from the laser diode 136 to the desired value. After the continuous lighting APC has been completed, a charging bias consisting of a DC bias voltage of −600 V and an AC bias voltage of 400 Hz and 1600 Vp-p superposed on the DC bias voltage is applied to the charging roller 2, and the sensitive drum 108 is charged at −600 V. Next, a development bias consisting of a DC bias voltage of −450 V and an AC bias voltage of 1800 Hz and 1600 Vp-p superposed on the DC bias voltage is applied to the developer carrier of the development device 4 having a negative charged toner. A positive transfer bias of +1.5 KV is applied to the same tranfer roller 5 as that described above with respect to the third embodiment.

When printing of a first page is started, the laser diode 136 is constant-current driven by the current determined during forward rotation to effect exposure. The surface potential of the sensitive drum 108 exposed is reduced to −150 V, and the image is developed by the toner of the development device 4 and is transferred to the transfer sheet 112 by the transfer roller 5.

During the paper interval period after printing of one page, the same unblanking APC as that in the third embodiment is effected to correct the intensity of the optical output from the laser diode 136.

A negative transfer bias of −2 kV is applied to the transfer roller 5 during the paper interval period. Since at this time the surface of the sensitive drum 108 is uniformly charged at −600 V, the negatively charged toner attached to the surface of the transfer roller 5 is transferred from this surface to the surface of the sensitive drum 108. The surface of the transfer roller 5 is thereby cleaned. The unblanking APC effected during the paper interval period prevents the development toner on the sensitive drum 108 from attaching to the transfer roller 5 and contaminating the surface thereof when continuous lighting APC is effected. Also, the surface of the transfer roller 5 can be uniformly cleaned because the surface potential of the sensitive drum 108 at the time of paper interval roller cleaning is uniform.

If the difference between the negative transfer bias and the surface potential of the sensitive drum 108 is larger, the effect of cleaning the surface of the transfer roller 5 is improved. However, the negative transfer bias must be limited to a level at which the risk of insulation breakdown of the sensitive material is negligible. According to an examination made by the inventors, insulation breakdown of the sensitive drum 108 occurs at a negative transfer bias of −4 kV. It is therefore preferable to set the negative transfer bias to −3.5 kV or lower.

At the time of printing of a second page, the laser diode 136 is constant-current driven by the current determined by paper interval unblanking APC to effect image exposure. At this time the negative transfer bias is applied.

When printing of a final page has been completed, the laser beam printer starts backward rotation, turns off the charging bias, the development bias and the positive transfer bias, and stops.

According to this embodiment, the first printing time and the possibility of large image gradation non-uniformity can be reduced as described above with respect to the third embodiment. Also, contamination of the back surface of the transfer sheet 112 can be prevented because contamination of the transfer roller 5 is prevented. Since cleaning of the transfer roller 5 is effected during the paper interval period, the transfer roller 5 cleaning time during forward or backward rotation can be reduced. The overall printing time can be reduced, and the wear of the sensitive drum 108 caused at the cleaning section during rotation thereof can be reduced, thereby increasing the life of the sensitive drum 108.

Fifth Embodiment

In the fifth embodiment, the size of the transfer sheet in the image scanning widthwise direction is detected to change the emission time at the time of paper interval unblanking APC.

This embodiment will be described below with reference to FIG. 22.

Figure 22:
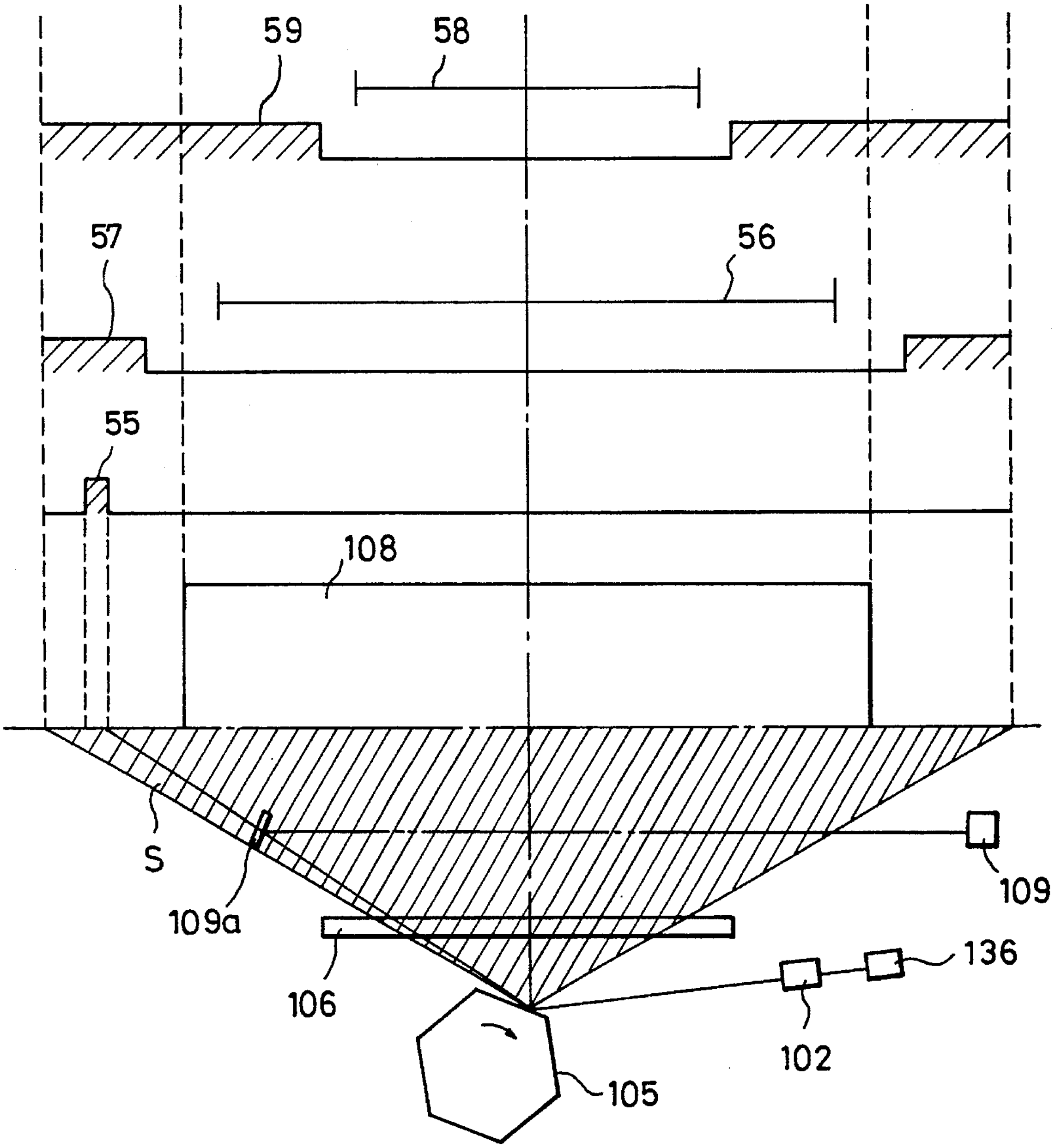
FIG. 22 is a diagram of operation timing in accordance with a fifth embodiment of the present invention.

An image recording apparatus shown in FIG. 22 has a sensitive drum 108, a semiconductor laser light source 136, a collimator lens 102, a polygon mirror 105 for scanning using a laser beam, an imaging lens 106 for converging the laser beam so as to set a predetermined beam diameter, and a reflecting mirror 109*a* for incidence of a part of the laser beam upon a laser beam detector 109. A position at which a signal for controlling the image signal is sent to an image signal control circuit is indicated at 55, and a region for sweeping of the laser beam is indicated by S (hatched area).

In the image recording apparatus of this embodiment, the size of the transfer sheet in the image scanning widthwise direction is detected before image recording by a paper feed cassette capable of discriminating the transfer sheet size or a transfer sheet width sensor 67 (FIG. 18).

Continuous lighting APC is effected during forward rotation before recording of the image of a first page, and the laser diode 136 is constant-current driven to effect image exposure for the first page. During the period of paper interval between the first and second pages, and APC is effected at the position corresponding to the image area on the transfer sheet according to the detected transfer sheet size to correct the current for driving the laser diode 136.

For example, if a transfer sheet size 56 shown in FIG. 22 is detected, APC is effected with respect to an area 57 or, if a transfer sheet size 58 is detected, APC is effected with respect to an area 59.

In the case of a small-size transfer sheet, the amount of correction of the intensity of the optical output from the laser diode during one emission for paper interval unblanking APC is increased to reduce the number of emission scanning times during paper interval unblanking APC.

Also, in the case of a small-size transfer sheet, the sensitive drum 108 develops a memory when the transfer bias is applied to a portion exposed for paper unblanking APC. However, this portion is located outside the area of the transfer sheet, and therefore the memory does not influence the image.

In this embodiment, the extent of contamination of the transfer roller 5 caused when the exposed portion is developed is not substantially large because the number of paper interval APC scanning times is small. Preferably, bias for moving the toner to the sensitive drum 108 may be applied to the transfer roller 5, or the surface of the transfer roller 5 may be mechanically rubbed to remove the toner from the surface of the transfer roller 5.

Sixth Embodiment

Figure 26:
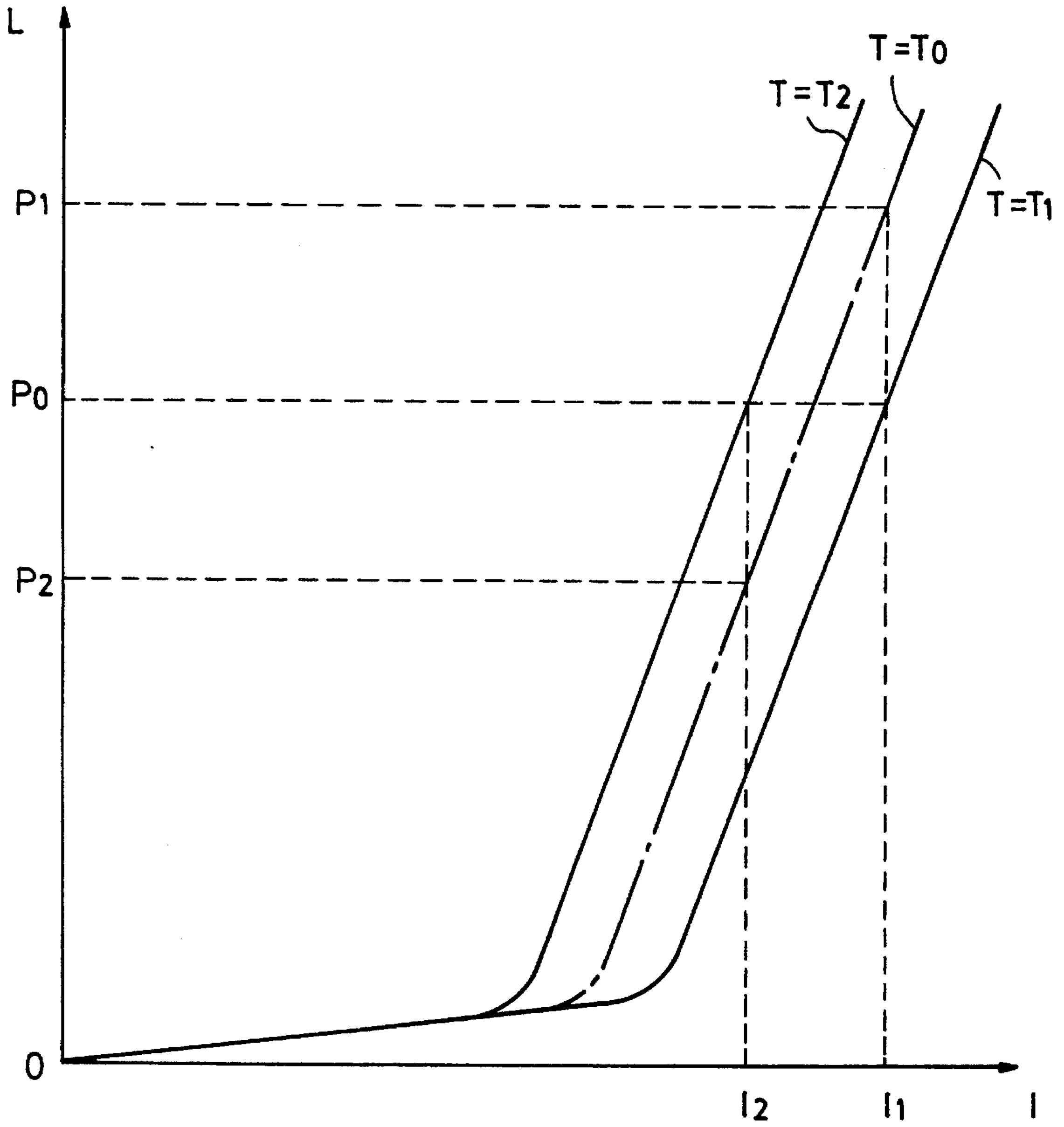
FIG. 26 is a schematic diagram of characteristics (I-L characteristics) of the emission intensity of a semiconductor laser with respect to the driving current.

FIG. 26 schematically show current-luminance characteristics (I-L characteristics) of the emission intensity of the semiconductor laser with respect to the driving current.

In the above-described embodiment, when the power source of the laser beam printer is first turned on or during the period of forward rotation in which continuos lighting is effected for APC exposure, the heat generated by self heating of the semiconductor laser is accumulated. The temperature of the semiconductor laser chip is thus increased, and an I-L characteristic represented by $T=T_1$ curve is exhibited.

If at this time the driving current for obtaining the target optical output intensity $P_0$ is $I_1$, and if the temperature of the laser chip changes to $T=T_0$ when exposure is actually effected for an image of a first page having a certain print rate, the optical output intensity at which image exposure is effected is $P_1$ as can be read from diagram.

During paper interval unblanking APC exposure, the semiconductor laser releases heat so that its temperature is reduced, because the laser lighting is intermittently effected between long resting periods. An I-L characteristic exhibited in this case is as represented by $T=T_2$ curve.

If at this time the driving current for obtaining the target optical output intensity $P_0$ is $I_2$, and if exposure is effected for an image having the same certain print rate as the first page image, the temperature of the laser chip changes to $T=T_0$, and the optical output intensity at which image exposure is effected is $P_2$.

Consequently, in a case where continuous lighting APC is effected during forward rotation and where unblanking APC is effected during the paper interval period, the exposure light intensity varies with respect to images of the same print rates on the first and subsequent pages, and there is a risk that there will be changes in the gradation of recorded images between pages as well as changes in the line spacing of rows of characters or the like.

Figure 23:
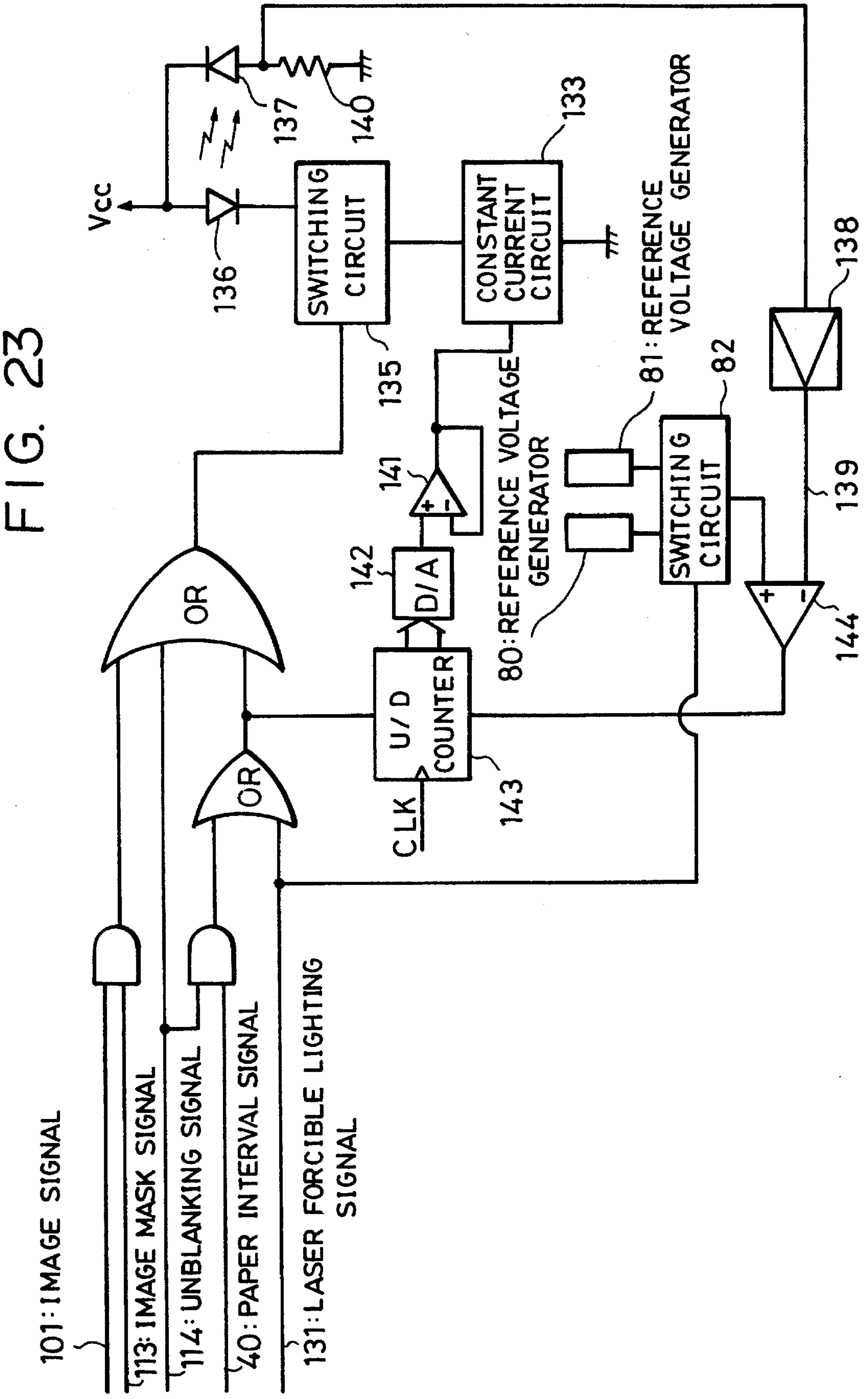
FIG. 23 is a diagram of an APC circuit in accordance with a sixth embodiment of the present invention.

FIG. 23 is a block diagram of an automatic optical output control circuit of the image exposure unit in accordance with the sixth embodiment of the present invention.

In this embodiment, the laser forcible lighting signal 131, which is used to forcibly light the laser irrespective of image synchronization, is set as "True" to forcibly light the laser diode 136 when the power source is turned on or at the time of forward rotation.

Simultaneously, the up/down counter 143 starts counting because the laser forcible lighting signal 131 is "True".

Switching circuit 82 is responsive to the state of laser forcible lighting signal 131. When the laser forcible lighting signal 131 is "True", the voltage generated by a continuous lighting reference voltage generator 80 is input into the comparator 144 by a switching circuit 82.

The photodiode 137 returns a feedback signal of the voltage applied to the laser diode 136 to the comparator 144 through the amplifier 138, and this signal is compared with the voltage generated by the continuous lighting reference voltage generator 80. If the feedback voltage is lower than the reference voltage, the output from the comparator 144 causes the up/down counter 144 to count up, and the current flowing through the laser diode 136 is increased by the constant-current circuit 133 through the buffer 141. If the feedback voltage becomes equal to the reference voltage, APC is terminated, the laser forcible lighting signal 131 is set as "False", and the counter is set in the holding state.

The laser diode 136 is constant-current driven by the current thereby held to effect first page image exposure.

At a paper interval time between the completion of the first page image exposure and the start of second page image exposure, the paper interval signal 40 is set as "True".

At this time, the laser forcible lighting signal 131 is "False", and the switching circuit 82 inputs the voltage generated by an unblanking lighting reference voltage generator 81 into the comparator 144. The voltage generated by the unblanking lighting reference voltage generator 81 is higher than the voltage generated by the continuous lighting reference voltage generator 80. These voltages are selectively used to equalize the laser emission intensity with respect to the first and second pages by considering the fact that while the laser driving current is constant, a light intensity obtained by intermittent lighting such as unblanking lighting using long resting periods is greater than a light intensity obtained by continuous lighting.

After the correction of the optical output intensity has been completed by effecting unblanking APC during main scanning for one to several lines, the paper interval signal 40 is set as "False", the counter 143 is set in the holding state, and the laser diode 136 is constant-current driven by the current thereby held, thereby effecting image exposure for the second page.

With respect to paper intervals of the second and subsequent pages, paper interval unblanking APC is also effected as in the case of the paper interval between the first and second pages, and the variation in the optical output intensity due to the increase in the temperature of the laser and other factors is corrected.

Figure 1:
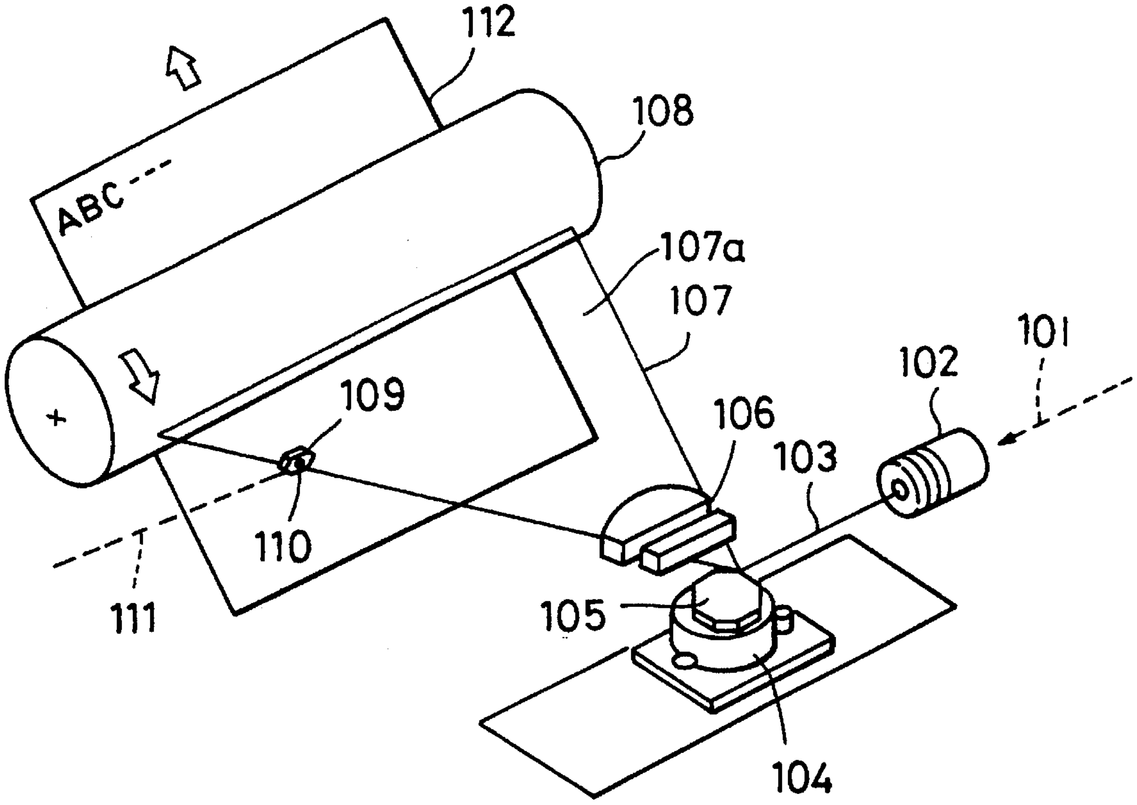
FIG. 1 PRIOR ART
FIG. 1 is a schematic perspective view of the construction of an ordinary laser beam printer.

A specific example of the application of the arrangement of FIG. 23 to a laser printer such as that shown in FIGS. 1 and 2 will be described below.

Referring to FIG. 2, the sensitive drum 108 formed of an aluminum cylinder which has a diameter of 30 mm to which an OPC sensitive material is applied is rotated at a process speed of 47 mm/sec and is uniformly charged at −600 V by the charging roller 2. A laser beam image-modulated at a density of 300 dpi is projected on the charged surface by the image exposure unit 3, and the potential of irradiated portions is reduced so that a static electricity latent image is formed.

When the static electricity latent image is moved to the development position on the development device at which it faces the sensitive drum 108, a negatively charged toner is supplied from the development device 4 to be attached to the latent image portions, thereby forming a toner image.

When the toner image is moved by further rotation of the sensitive drum 108 to the transfer position, i.e., a press-contact nip between the sensitive drum 108 and the transfer roller 5 having a diameter of 20 mm and maintained in pressure contact with the sensitive drum 108, the transfer sheet 112 is transported to the transfer position in synchronization with the toner image movement, thereby transferring the toner image on the sensitive drum 108 to the transfer sheet 112.

Thereafter, the transfer sheet 112 is separated from the sensitive drum 108 and transported to the fixing device 6 to fix the toner image on the transfer sheet 112. On the other hand, a part of the toner left on the sensitive drum 108 is removed by the cleaner 7, and the sensitive drum 108 is used for the next image formation process.

This process will be described below in more detail with respect to the arrangement of FIG. 23.

A laser unit having a 5 mW laser diode 136 and a photodiode 137 housed in an integrally formed package having a diameter of 9 mm was used. Each of the continuous lighting reference voltage generator 80 and the unblanking lighting reference voltage generator 81 was constituted by a variable resistor for dividing the circuit power supply voltage Vcc. A 12-bit D/A converter was used as the D/A converter 142.

The time needed for continuous lighting APC exposure was about 200 msec and blanking APC exposure was effected in a period of about 150 μsec in BD cycles of about 1.8 msec.

It is possible to limit the variation in the optical output intensity during image exposure for the first, second and subsequent pages to ±1% or less by increasing the voltage generated by the unblanking lighting reference voltage generator 81 by 10% from the level corresponding to the voltage generated by the continuous lighting reference voltage generator 80.

The variation in the reduced potential of exposed portions between pages is thereby reduced and the image density and the line spacing of rows of characters or the like can be constantly maintained.

Also, according to this embodiment, it is also possible to absorb variations in I-L characteristics of individual laser units with respect to the lighting pulse duty by adjusting the variable resistors of the unblanking lighting reference voltage generator 81 and the continuous lighting reference voltage generator 80.

It is preferable to perform paper interval unblanking APC a sufficient time after the completion of image exposure for the previous page, that is, after the influence of the heat of the laser chip caused by the previous page image exposure has been reduced. In this embodiment, unblanking APC is performed one second after the previous page image exposure. However, no substantial difference is exhibited between the intensities of optical outputs applied to adjacent pages irrespective of whether the print rate of the previous page is 0% or 100%. It was found by an examination that the optical output intensity after correction based on unblanking APC is not substantially influenced by the print rate of the previous page if the time between the completion of previous page exposure and the start of unblanking APC is 0.4 sec or longer.

Seventh Embodiment

The seventh embodiment of the present invention will be described below.

In the seventh embodiment, the target value of paper interval unblanking APC is changed over according to the print rate of the previous page.

Figure 24:
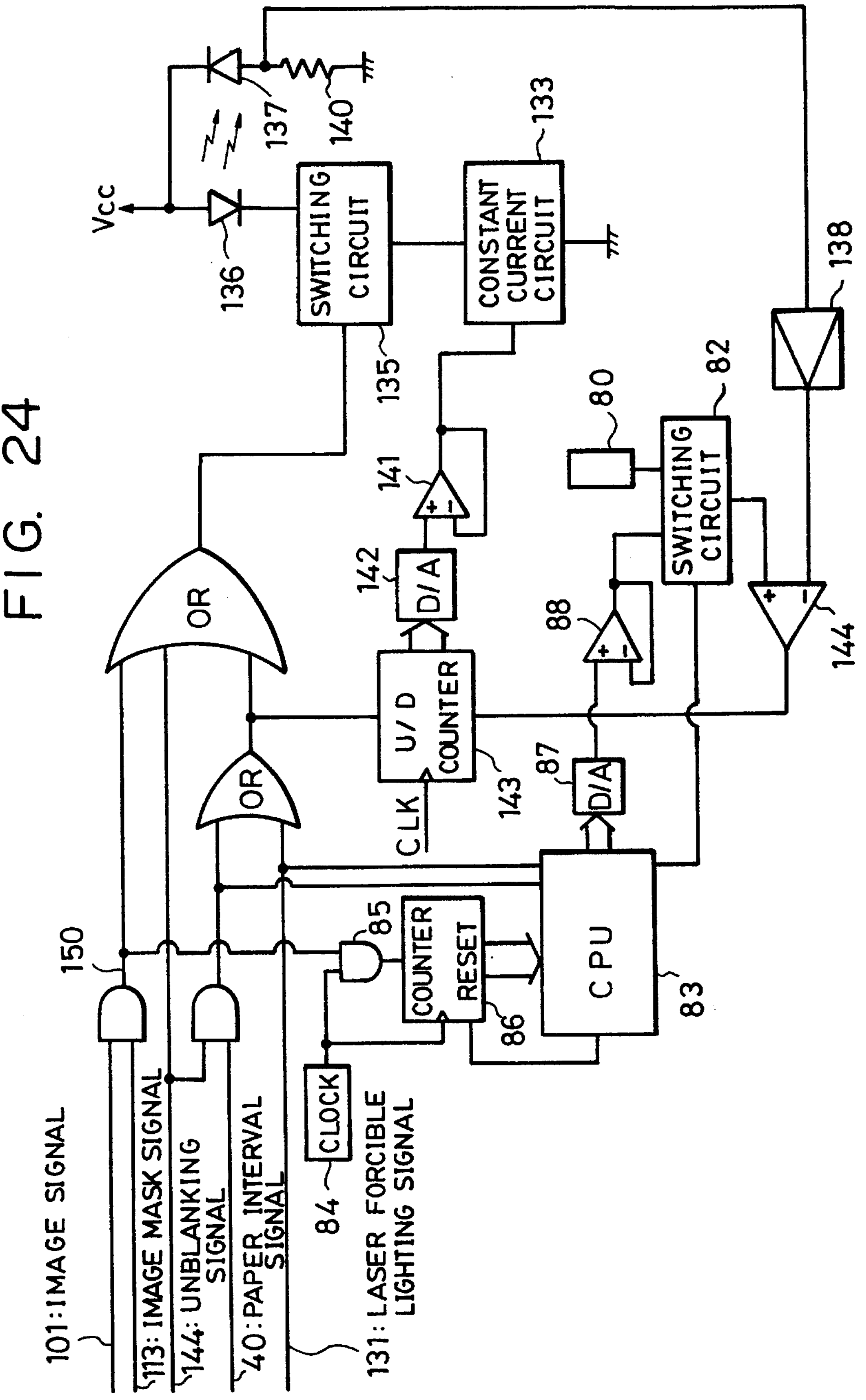
FIG. 24 is a diagram of an APC circuit in accordance with a seventh embodiment of the present invention.

FIG. 24 shows an automatic optical output control circuit of the image exposure unit in accordance with the seventh embodiment. Components having the same functions as those of the sixth embodiment are indicated by the same reference characters.

When a CPU 83 provided in the image exposure unit receives the forcible lighting signal 131 when the power source of the laser beam printer is turned on or at the time of forward rotation, it sends a reference voltage selection signal 83*a* to a switching circuit 82 to input the voltage generated by a continuous lighting reference voltage generator 80 into the comparator 144, thereby effecting continuous lighting APC.

When image exposure for a first page is started, clock 84 in synchronization with the image clock and an image signal 150 are input into an AND circuit 85. A counter 86 which is reset before the image exposure is started counts up signals output from the AND circuit 85.

When the first page image exposure is completed, the count value of the counter 86 designates the number of print pixels of the first page. The CPU 83 receives the count value from the counter 86 and resets the counter 86.

During the period of the paper interval between the first and second pages, the paper interval signal 40 is set as "True" and unblanking APC is performed. When the CPU 83 receives the paper interval signal 40, it determines from the count value the calorific power of the laser diode 136 according to the print rate (number of pixels) of the first page and sends a digital value corresponding to the target optical output for APC exposure according to this calorific power to a D/A converter 87 and a buffer 88, thereby generating an unblanking lighting reference voltage. Simultaneously, the CPU 83 sends the reference voltage selection signal to the switching circuit 82 to input the unblanking lighting reference voltage from buffer 88 into the comparator 144.

Unblanking APC is successively effected during the period of the paper interval between the first and second pages as in the sixth embodiment. To effect second page image exposure, the laser diode 136 is constant-current driven. For second page image exposure also, the print rate is detected by the above-described method, and the target optical output for unblanking APC exposure during the next paper interval period is changed according to this print rate. This operation is thereafter repeated.

Immediately after the completion of image exposure for the previous page, in a short period such as that for unblanking APC, the optical output intensity varies by the influence of the calorific power owing to the difference between the calorific powers according to the print rates. In this embodiment, however, the target optical output for unblanking APC exposure during the next paper interval period is changed over according to the print rate of the previous page, thereby improving the APC accuracy. In addition, since the unblanking APC can be executed immediately after the image exposure for the previous page, the printing speed of the laser beam printer or the like can be increased.

If the print rate is higher, the target optical output for paper interval unblanking APC is reduced. The target optical output for paper interval unblanking APC may be obtained from the detected print rate by calculation or by referring to a table prepared in a ROM or RAM.

In this embodiment, the CPU 83 is provided in the image exposure unit. Alternatively, the CPU 97 used for the control of the laser beam printer may have the functions of conducting the process of this embodiment.

Eighth Embodiment

The eighth embodiment of the present invention will be described below.

In the eighth embodiment, the intensity of the optical output from the laser diode 136 at the time of forced laser lighting for producing the horizontal sync signal (BD) is detected during the period of image printing, and the target value of paper interval unblanking APC is changed according to the detected optical output intensity.

Figure 25:
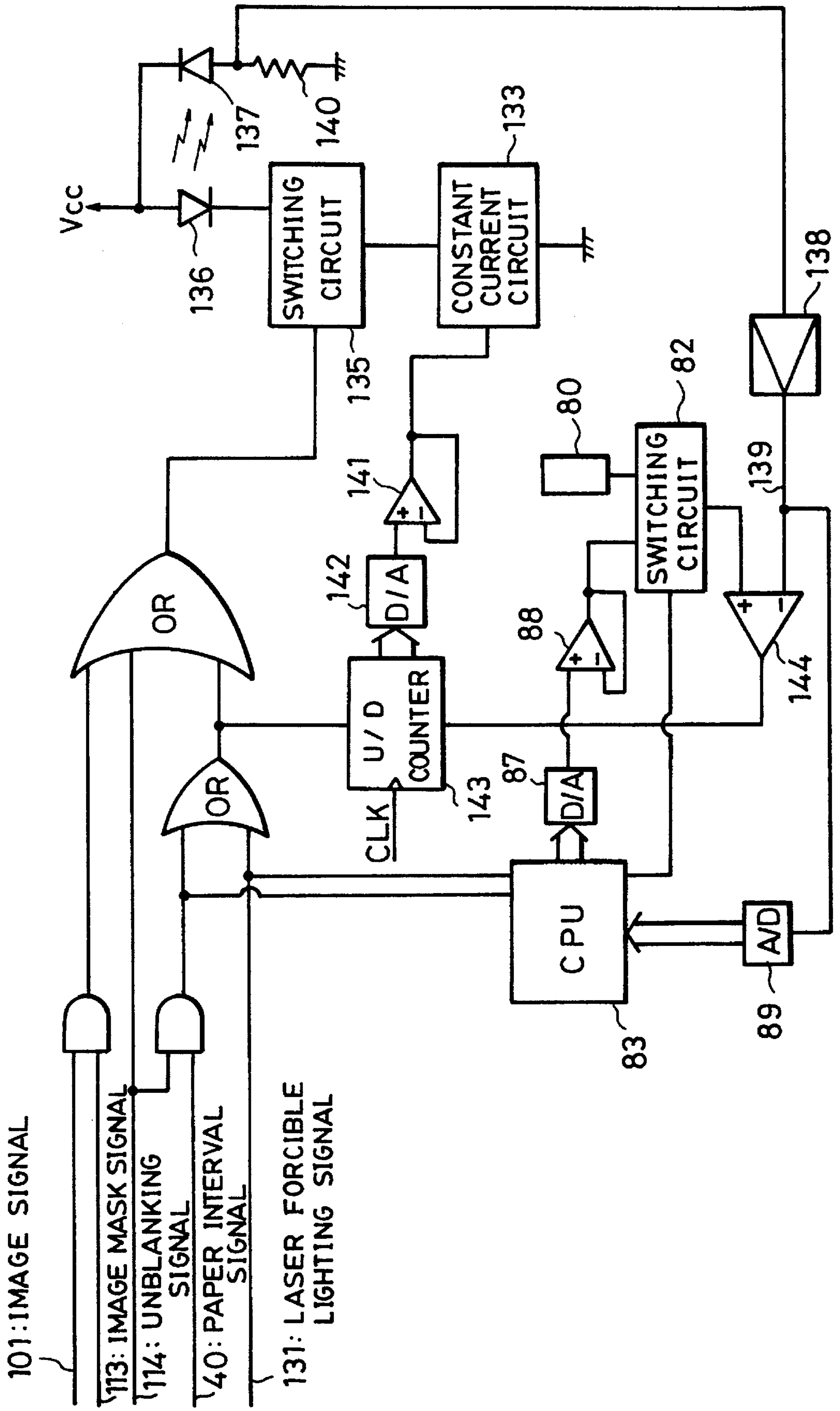
FIG. 25 is a diagram of an APC circuit in accordance with an eighth embodiment of the present invention.

FIG. 25 shows an automatic optical output control circuit of the image exposure unit in accordance with the eighth embodiment.

When a CPU 83 provided in the image exposure unit receives the laser forcible lighting signal 131 when the power source of the laser beam printer is turned on or at the time of forward rotation, it sends a reference voltage selection signal 83*a* to the switching circuit 82 to input the voltage generated by a continuous lighting reference voltage generator 80 into the comparator 144, thereby effecting continuous lighting APC.

The laser diode 136 is constant-current driven by the current value held at this time to effect image exposure for a first page.

When first page image exposure is started, the intensity of the optical output from the laser diode 136 at the time of forced laser lighting for producing the horizontal sync signal (BD) is detected by the photodiode 137, and the output from the amplifier 138 is input into the CPU 83 through the A/D converter 89.

The CPU 83 sets the target optical output for unblanking APC during the period of the paper interval between the first end second pages according to the intensity of the optical output from the laser diode 136 with respect to an area outside the image formation area at a suitable time during the image exposure period by referring to the value of the A/D converter 89.

Unblanking APC during the period of the paper interval between the first and second pages is performed in the same manner as the seventh embodiment.

In accordance with the eighth embodiment, the intensity of the optical output from the laser diode 136 is detected during the page exposure period under substantially the same lighting pulse width emission conditions as paper interval unblanking APC exposure, thereby making it possible to set the target optical output with improved accuracy.

The functions of the comparator 144, the up/down counter 143 and other components in the first to eighth embodiments of the present invention may be provided by a hardware arrangement or by software programs executed by the CPU 97.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image recording apparatus comprising:

a light beam generator for generating a light beam modulated by an image signal;

a light beam deflector for cyclically scanning a surface of a light-sensitive body with the light beam generated by said light beam generator;

a light beam detector for detecting the light beam outside an area for image formation effected by the modulated light beam; and a controller for forcibly actuating said light beam generator in each scanning cycle during an unblanking period corresponding to an area outside the area for image formation to enable said light beam detector to detect the light beam;

wherein said controller selectively shifts start times for the unblanking period with respect to a scanning time in which the light beam generated by said light beam generator is modulated by the image signal and another scanning time which corresponds to intervals between images and in which the light beam is not modulated by the image signal.

2. An image recording apparatus according to claim 1, further comprising:

a light quantity detector for detecting the quantity of light generated by said light beam generator; and a light quantity controller for controlling the quantity of light of the light beam during the unblanking period based on the detection output from said light quantity detector.

3. An image recording apparatus according to claim 2, wherein said image recording apparatus effects a light quantity detection and a light quantity control during the period for scanning an image formation area on the sensitive body before an image forming operation, and also effects light quantity detection and a light quantity control during a single unblanking period corresponding to an area outside the image formation area on the sensitive body after the start of the image forming operation.

4. An image recording apparatus according to claim 3, further comprising:

a charging unit for uniformly charging a surface of the sensitive body;

a development unit for developing a toner image from a latent image formed on the sensitive body by scanning using the light beam modulated by the image signal after the sensitive body has been uniformly charged; and a transfer unit for transferring the toner image formed on the sensitive body by said development unit to a transfer sheet.

5. An image recording apparatus according to claim 4, wherein a transfer bias having a polarity opposite to that of another transfer bias for the image forming operation is applied to said transfer unit at a time between the moment at which the light quantity control is completed prior to the image forming operation using the light beam and the moment at which the image forming operation is started.

6. An image recording apparatus according to claim 5, wherein application of a development bias, for formation of the toner image, to said development unit is started after the moment at which the light quantity control is completed prior to the image forming operation using the light beam, and application of the transfer bias for the image forming operation to said transfer unit is started a predetermined time before the moment at which the image forming operation is started.

7. An image recording apparatus comprising:

deflecting means for deflecting an optical output from a light source onto a light-sensitive body;

light intensity detection means for detecting the intensity of the optical output from a light source; and intensity control means for controlling the intensity of the optical output from said light source so that the intensity of the optical output from said light source detected by said light detection means becomes a target value for an image forming operation;

wherein said intensity control means is operable in a first mode in which the intensity of optical output is controlled during a period including a period for scanning an image area of the light-sensitive body with the deflected light, and is also operable in a second mode in which the intensity of the optical output is controlled during a period not including the period for scanning the image area of the light-sensitive body with the deflected light, and wherein said intensity control means is capable of setting the target value for the image forming operation in the second mode different from the target value for the image forming operation in the first mode.

8. An image recording apparatus according to claim 7, wherein said intensity control means sets the target value in the second mode higher than that in the first mode.

9. An image recording apparatus according to claim 7, wherein said intensity control means controls the intensity of the optical output in the first mode before a start of an image forming operation, and in the second mode after the start of the image forming operation.

10. An image recording apparatus according to claim 9, wherein said intensity control means controls the intensity of the optical output in the second mode in a period corresponding to intervals between images.

11. An image recording apparatus according to claim 10, wherein said intensity control means sets the target value in the second mode in accordance with a light emitting state in a previous image forming operation.

12. An image recording apparatus according to claim 10, wherein said intensity control means sets the target value in the second mode in accordance with a detection by said light intensity detection means during a previous forming operation.

13. An image recording apparatus according to claim 7, further comprising:

a charging unit for uniformly charging a surface of the light-sensitive body;

a development unit for developing a toner image from a latent image formed on the light-sensitive body by scanning using the light beam modulated by the image signal after the light-sensitive body has been uniformly charged; and a transfer unit for transferring the toner image formed on the light-sensitive body by said development unit to a transfer sheet.

14. An image recording apparatus according to claim 13, wherein a transfer bias having a polarity opposite to that of another transfer bias for the image forming operation is applied to said transfer unit at a time between the moment at which the light quantity control is completed prior to the image forming operation using the light beam and the moment at which the image forming operation is started.

15. An image recording apparatus according to claim 14, wherein application of a development bias, for formation of the toner image, to said development unit is started after the moment at which the light quantity control is completed prior to the image forming operation using the light beam, and application of the transfer bias for the image forming operation to said transfer unit is started a predetermined time before the moment at which the image forming operation is started.

16. An image recording apparatus, comprising:

a light beam generator for generating a light beam;

a light beam deflector for deflecting the light beam onto a photosensitive drum;

a light beam detector for detecting the deflected light beam outside an area for image formation effected by the light beam onto the photosensitive drum; and control means for forcibly activating the light beam generator in each scanning during an unblanking period which corresponds to an area outside the image formation area to effect light beam detection of the light beam, wherein said control means selectively switches a timing for starting the unblanking period in accordance with a size of an image to be recorded.

17. An image recording apparatus according to claim 16, wherein the control means selectively switches a timing for starting and for stopping the unblanking period in accordance with a size of an image to be recorded.

18. An image recording apparatus according to claim 16, further comprising:

a light quantity detector for detecting the quantity of light generated by said light beam generator; and a light quantity controller for controlling the quantity of light of the light beam during the unblanking period based on the detection output from said light quantity detector.

19. An image recording apparatus according to claim 16, wherein said image recording apparatus effects a light quantity detection and a light quantity control during the period for scanning an image formation area on the photosensitive drum before an image forming operation, and also effects light quantity detection and a light quantity control during a single unblanking period corresponding to an area outside the image formation area on the photosensitive drum after the start of the image forming operation.

20. An image recording apparatus according to claim 19, further comprising:

a charging unit for uniformly charging a surface of the photosensitive drum;

a development unit for developing a toner image from a latent image formed on the photosensitive drum by scanning using the light beam modulated by the image signal after the photosensitive drum has been uniformly charged; and a transfer unit for transferring the toner image formed on the photosensitive drum by said development unit to a transfer sheet.

21. An image recording apparatus according to claim 20, wherein a transfer bias having a polarity opposite to that of another transfer bias for the image forming operation is applied to said transfer unit at a time between the moment at which the light quantity control is completed prior to the image forming operation using the light beam and the moment at which the image forming operation is started.

22. An image recording apparatus according to claim 21, wherein application of a development bias, for formation of the toner image, to said development unit is started after the moment at which the light quantity control is completed prior to the image forming operation using the light beam, and application of the transfer bias for the image forming operation to said transfer unit is started a predetermined time before the moment at which the image forming operation is started.

* * * * *